United States Patent
Tanaka et al.

(10) Patent No.: US 10,870,355 B2
(45) Date of Patent: Dec. 22, 2020

(54) MOTOR DRIVING CONTROL APPARATUS AND ELECTRIC APPARATUS

(71) Applicants: MICROSPACE CORPORATION, Tokyo (JP); TAIYO YUDEN CO., LTD., Tokyo (JP)

(72) Inventors: Masato Tanaka, Tokyo (JP); Yasuo Hosaka, Tokyo (JP); Hiromi Hagiwara, Tokyo (JP); Teruaki Kawahigashi, Tokyo (JP); Yuto Kajiya, Tokyo (JP); Taichi Yanaoka, Tokyo (JP)

(73) Assignees: MICROSPACE CORPORATION, Tokyo (JP); TAIYO YUDEN CO., LTD., Tokyo (JP)

( * ) Notice: Subject to any disclaimer, the term of this patent is extended or adjusted under 35 U.S.C. 154(b) by 184 days.

(21) Appl. No.: 16/192,621

(22) Filed: Nov. 15, 2018

(65) Prior Publication Data
US 2019/0084426 A1    Mar. 21, 2019

Related U.S. Application Data

(63) Continuation of application No. PCT/JP2017/015524, filed on Apr. 18, 2017.

(30) Foreign Application Priority Data

May 17, 2016    (JP) ................................ 2016-099073

(51) Int. Cl.
*B60L 7/26* (2006.01)
*H02P 21/22* (2016.01)
(Continued)

(52) U.S. Cl.
CPC .................. *B60L 7/26* (2013.01); *B60L 7/22* (2013.01); *B60L 9/18* (2013.01); *B60L 15/2009* (2013.01);
(Continued)

(58) Field of Classification Search
USPC ........................................................ 318/376
See application file for complete search history.

(56) References Cited

U.S. PATENT DOCUMENTS 5,291,106 A * 3/1994 Murty ....................... H02P 6/24
                                                            318/375
5,583,406 A 12/1996 Mutoh et al. ................. 318/376
(Continued)

FOREIGN PATENT DOCUMENTS

EP    3 009 295 A1    4/2016
GB    2477229 A       7/2011
(Continued)

OTHER PUBLICATIONS

English translation of the Written Opinion (PCT/ISA/237) issued in PCT/JP2017/015524 dated Aug. 1, 2017.
(Continued)

*Primary Examiner* — Jorge L Carrasquillo
(74) *Attorney, Agent, or Firm* — Stein IP, LLC

(57) ABSTRACT

This motor driving control apparatus has (A) an inverter unit configured to drive a motor; (B) a separation switch configured to separate a power source from the inverter unit; and (C) a controller configured to instruct the separation switch to separate the power source from the inverter unit and control the inverter unit to perform switching according to a speed and a braking target torque, upon detecting an event that braking should be performed without passing a regenerative current to the power source from the inverter unit. By introducing the separation switch that operates as described above, it becomes possible to perform control so as to consume the power by the motor itself without passing the regenerative current to the power source such as a battery.

24 Claims, 28 Drawing Sheets

(51) Int. Cl.
*H02P 21/06* (2016.01)
*B60L 50/20* (2019.01)
*H02M 7/48* (2007.01)
*B60L 9/18* (2006.01)
*B60L 7/22* (2006.01)
*B60L 15/20* (2006.01)
*B62M 6/50* (2010.01)
*B60L 50/51* (2019.01)

(52) U.S. Cl.
CPC .............. *B60L 50/20* (2019.02); *B62M 6/50* (2013.01); *H02M 7/48* (2013.01); *H02P 21/06* (2013.01); *H02P 21/22* (2016.02); *B60L 50/51* (2019.02); *B60L 2200/12* (2013.01); *Y02T 10/72* (2013.01)

(56) References Cited

U.S. PATENT DOCUMENTS

| | | | |
|---|---|---|---|
| 5,877,601 A * | 3/1999 | Obara | B60L 3/0084 318/139 |
| 6,121,740 A | 9/2000 | Gale et al. | 318/376 |
| 2011/0029179 A1* | 2/2011 | Miyazaki | B60L 50/16 701/22 |
| 2013/0181639 A1* | 7/2013 | Yamanaka | B62D 5/046 318/139 |
| 2014/0001987 A1* | 1/2014 | Okada | B60L 7/10 318/370 |
| 2014/0039742 A1 | 2/2014 | Tanaka et al. | |
| 2016/0121963 A1 | 5/2016 | Tanaka et al. | |
| 2017/0110994 A1 | 4/2017 | Tanaka et al. | |
| 2017/0201204 A1* | 7/2017 | Kawano | H02P 29/032 |
| 2017/0237381 A1* | 8/2017 | Shinohara | H02P 29/0241 318/400.27 |
| 2017/0305274 A1* | 10/2017 | Saha | H02P 3/24 |
| 2018/0278144 A1* | 9/2018 | Nakano | H02P 3/20 |

FOREIGN PATENT DOCUMENTS

| | | |
|---|---|---|
| JP | H10-150702 A | 6/1998 |
| JP | 2002-17098 A | 1/2002 |
| JP | 2011-211783 A | 10/2011 |
| JP | 2012-196104 A | 10/2012 |
| JP | 2015-186382 A | 10/2015 |
| WO | 2012/086459 A1 | 6/2012 |
| WO | 2014/200081 A1 | 12/2014 |
| WO | 2016/002744 A1 | 1/2016 |

OTHER PUBLICATIONS

Extended European Search Report dated Dec. 20, 2019, issued to European Application No. 17799093.4.
International Search Report (ISR) issued in PCT/JP2017/015524 dated Aug. 1, 2017.
Written Opinion (PCT/ISA/237) issued in PCT/JP2017/015524 dated Aug. 1, 2017.
Taiwanese Office Action dated Jan. 24, 2018 in a counterpart Taiwanese patent application No. 106114749.

* cited by examiner

MOTOR DRIVING CONTROL APPARATUS AND ELECTRIC APPARATUS

CROSS-REFERENCE TO RELATED APPLICATIONS

This application is a continuing application, filed under 35 U.S.C. section 111(a), of International Application PCT/JP2017/015524, which was filed on Apr. 18, 2017 and claimed the benefit of priority of the prior Japanese Patent Application No. 2016-099073 filed on May 17, 2016, the entire contents of which are incorporated herein by reference.

TECHNICAL FIELD

The present invention relates to a motor driving control apparatus.

BACKGROUND TECHNOLOGY

A motor in an electric bicycle, an electric vehicle or the like may be used for the regenerative braking in which the power is generated during the deceleration and the generated power is restored to a rechargeable battery, in addition to the powering drive at the time of the acceleration and the like.

However, in the following cases, the charging current during the regenerative braking (hereinafter also referred to as regenerative current) is restricted or not at all. Therefore, the regenerative braking cannot be applied or sufficient braking torque is outputted.
  a case where the battery is fully charged.
  a case where the battery is cold.
  a case where the regenerative current cannot flow due to other battery abnormality etc.

For example, after fully charging the battery at home, when a person who lives on the top of a slope suddenly goes down the slope, the regenerative braking cannot be used at the beginning, since the battery cannot be charged any more. Therefore, it becomes possible to use the regenerative braking only after any capacity vacancy in the battery is made by consuming the electric power by running on a flat ground or uphill slope after fully going down the slope.

Also at the temperature at which the electrolyte is frozen below freezing point, the regenerative braking is not used, because the charging to the battery is prohibited. In addition, there are cases where the battery detects other abnormalities and outputs a signal representing that the charging is impossible.

However, depending on the status of the battery, there are cases where the regenerative braking cannot be applied at all or only weak regenerative braking can be applied, even when it is preferable to use the motor braking because the regenerative braking can be used in the other case.

Therefore, depending on the status of the battery, the mechanical braking is used by the amount that the regenerative braking torque is insufficient from the required braking torque. However, it is necessary for the driver to handle so as to apply the mechanical braking by the missing amount, and the driver feels the large incongruity, namely, after the braking operation, the driver firstly becomes aware of the difference in efficacy to make a quick decision and response.

Therefore, if the operation by the driver is the same, it is desirable that the same motor braking always occurs regardless of the status of the battery.

In addition, even when using a primary battery that cannot be charged or when using an external power source that cannot be regenerated, it may be better to apply the motor braking with arbitrary braking torque without sticking to the regenerative braking in particular.

In other words, in the case of bicycles and cars, for example, when the speed or acceleration becomes excessive on a steep downhill or the like, it is useful to apply light braking automatically in accordance with the inclination, to relax the speed and acceleration. Also, there are cases where it is preferable that the braking is applied automatically in case of some abnormality.

In this way, because the braking can be applied only by an instruction from the controller even without equipping the mechanical braking servo and the braking can be applied with extremely stable torque as compared with the mechanical braking, which has large variations in the coefficient of friction, there is a case where the automatic motor braking is required even in a system that cannot use the regenerative braking.

As for such a problem, in an electric vehicle or a hybrid vehicle, there is a technique of automatically applying the mechanical braking as much as the insufficient amount of regenerative braking (for example, Patent Document 1). However, in order to realize this, an electric brake servo mechanism is provided. In the case of an automobile, since the brake servo mechanism is originally provided, the weight increase and cost increase are not so serious problems, but in the case of a light and inexpensive bicycle or the like, the weight increase and cost increase become a big problem.

Short-circuit braking is also known as motor braking (electromagnetic braking) that does not allow regenerative current to flow. However, the short-circuit braking has braking torque twice as much as the maximum regenerative braking force and cannot be adjusted, so it cannot be used in the same way as the regenerative braking.

As a method for eliminating such a drawback, a method has been proposed in which the three-phase all-short-circuit state and the full open state are alternately switched, and the torque is controlled by that switching PWM (Pulse Width Modulation) duty ratio (for example, Patent Document 2). However, this method cannot actually control it. Specifically, since the current that was flowing through the motor coil cannot be stopped immediately even during the full-open period, a current flows from the ground to the battery side via the parasitic diode of FET (Field Effect Transistor) every time it is opened, and the regenerative current flows to the battery, the regenerative braking eventually results.

Suppose that the regenerative current does not flow to the battery side by using a switching element without a parasitic diode, or by devising a circuit (for example, using two FETs each in reverse series) to eliminate the influence of the parasitic diode, a huge surge voltage is applied to the switching element as much as possible at the moment when it is fully opened, so that it will be damaged.

As another method, there is a method of totally realizing the loss braking that causes the braking torque without passing the regenerative current to the battery by consuming the electric power obtained by the regenerative braking with a separately provided resistor or the like. However, since the amount of heat generated by the resistance or the like is large, an expensive resistance with high power handling capability, a large heat sink or the like is provided. Accordingly, the cost increases or the weight increases.

Furthermore, as a method of applying electromagnetic braking at an arbitrary torque without passing a regenerative current to the battery, there is a method for consuming the electric power within the motor to freely control the regenerative current to the battery without changing the braking torque by passing the field current that does not contribute to the torque while maintaining, by the vector control method, the torque current for generating the torque, which is equal to that generated during the regenerative braking (for example, Patent Document 3). That is, by appropriately controlling the driving voltage and the driving lead angle, a desired braking torque is generated so that the regenerative current to the battery can be reduced or eliminated.

However, because the torque and the regenerative current to the battery are controlled by the advanced control, there are many difficulties in making the regenerative current to the battery zero, due to variations in various other constants and environmental conditions of the motor and the like. That is, it is necessary to perform high-speed and high-precision current feedback control, and it is difficult to constantly keep the regenerative current to the battery zero at all times while following the change in the braking force, the change in the motor speed, and other changes from the beginning of the braking. Therefore, there is a possibility that a situation that a small amount of regenerative current flows to the battery may occur frequently, which adversely affects the battery by that amount.

Namely, conventionally, there is no effective motor driving control technique for generating a braking torque without passing a current to a power source.

PRIOR TECHNICAL DOCUMENTS

Patent Document 1: Japanese Laid-open Patent Publication No. 2015-186382
Patent Document 2: Japanese Laid-open Patent Publication No. 2012-196104
Patent Document 3: Japanese Laid-open Patent Publication No. H10-150702

SUMMARY OF THE INVENTION

A motor driving control apparatus relating to the present invention includes: (A) an inverter unit configured to drive a motor; (B) a separation switch configured to electrically separate a power source from the inverter unit; and (C) a controller configured to instruct the separation switch to separate the power source from the inverter unit and control the inverter unit to perform switching according to a speed and a braking target torque, upon detecting an event that braking should be performed without passing a regenerative current to the power source from the inverter unit.

DESCRIPTION OF EMBODIMENTS

Figure 1:
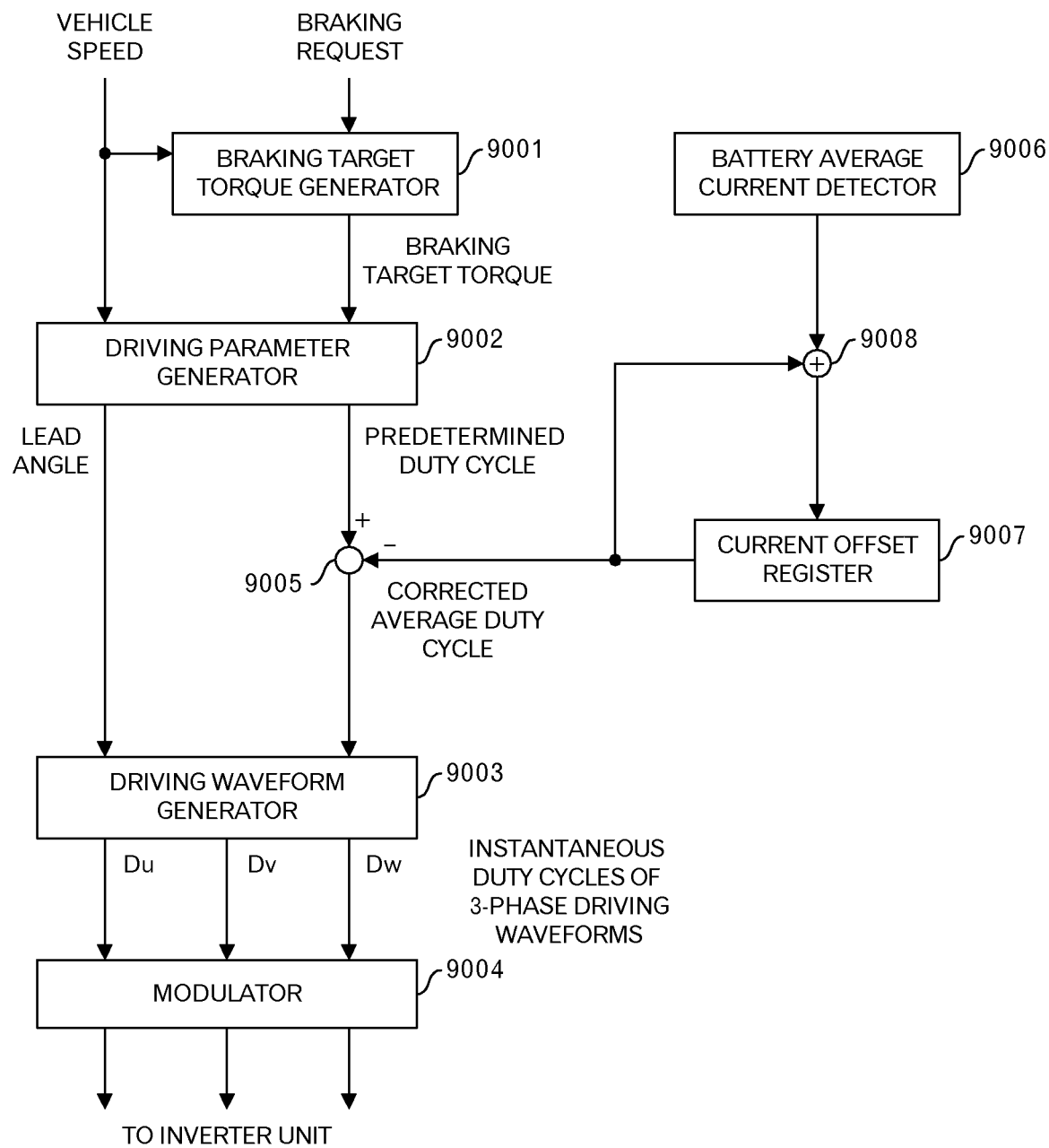
FIG. 1 is a diagram depicting an implementation example of loss braking by the vector control.

[Basic Technique Relating to Embodiments of the Present Invention]

First, the loss braking based on the vector control, which is a basic technique relating to the embodiments of the present invention, will be described.

In case of the loss braking by the vector control, a first current (also referred to as a torque current) which is the same as a current for generating the braking torque, that is, a current for the regenerative braking, and a second current for causing a resistive component in a motor coil to consume the power, that is, a current (also referred to as a field current) having a phase shifted by 90 degrees from the first current are caused to flow at the same time.

By the aforementioned first current, a desired braking torque can be obtained. Then, since the second current is shifted in phase by 90 degrees, the torque due to the second current alternately appears positive and negative at a frequency twice the current frequency, and the average torque becomes zero. Further, in the case of a three-phase motor, since the torque by each of the three-phase currents that have the difference of 120 degrees in the phase also has the difference of 120 degrees in the phase, the sum of the three-phase torques by the second current becomes zero at any moment without averaging the torques in the time.

Even in case of zero torque, as long as the current flows, it consumes the power calculated by multiplying the square of the current by the coil resistance. Therefore, if the second current is controlled, the power consumption by the second current can be freely controlled, so that the final regenerative power can be freely controlled while braking with the same torque as that during the regenerative braking, as a whole. That is, if the power consumption by the second current is made equal to the regenerative power by the first current, the regenerative current to the battery becomes zero.

At this time, as a control method of the second current, there are a weakening field current method in which the second current is caused to flow in the advanced direction with respect to the first current, that is, at +90-degree phase difference, and an intensifying field current method in which the second current is caused to flow in the delay direction with respect to the first current, that is, at −90-degree phase difference.

In the case of the weakening field current method in which the current flows by +90-degree phase difference, the total voltage driving waveform applied to the motor coil terminals has a characteristic that it becomes low voltage, because of the influence of the self inductance of the motor coil itself and the mutual inductance between the coils. In addition, since the AC ripple current flowing through the smoothing capacitor for the power source becomes smaller, there is also the advantage that the smoothing capacitor that has a smaller allowable ripple current and a lower withstanding voltage is sufficient.

However, when the +90-degree phase difference control is delayed for a sudden change in speed and the phase is shifted, a phenomenon occurs in which a torque occurs at the point where it should originally be zero torque. That is, there is a tendency that the torque is reflected in the direction in which the change in speed is more amplified, the torque and the speed tend to be unstable, and vibration is likely to occur, so that high speed and highly accurate control is required.

On the other hand, in the case of the intensifying field current method in which the current is caused to flow with a phase difference of −90 degrees, the total voltage driving waveform has a characteristic that it becomes a high voltage. For this reason, there are problems such as a case occurs where the voltage becomes higher than the battery voltage and it is impossible to perform appropriate control, moreover, the AC ripple current flowing to the smoothing capacitor for the power source becomes large, accordingly the smoothing capacitor for the power source, which has a large allowable ripple current, has to be employed.

However, the torque, which occurs due to the delay of the −90-degree phase difference control for the sudden change in the speed, tends to be reflected to the torque in a direction in which the change in the speed is moderated, and there is an advantage that the torque and the speed are stabilized.

In practice, one of these two methods will be selected in consideration of various circumstances on the product configuration.

In addition, when both of the driving waveform of the first current and the driving waveform of the second current are sine waves, the total voltage driving waveform also becomes a sinusoidal wave whose amplitude and phase are different from those of the first and second currents. That is, the first and second currents can be controlled by controlling the amplitude (that is, the average duty cycle) and the lead angle of a single sinusoidal wave.

Therefore, the average duty cycle and the lead angle to generate the same loss braking torque as the target regenerative braking torque are calculated in advance for each speed, and by switching the inverter to drive the motor based on the signals of the total voltage driving waveforms having the average duty cycle and the lead angle, it is possible to realize the loss braking in which the same torque as the regenerative braking torque is generated.

FIG. 1 depicts an example of implementation to realize the loss braking based on such vector control.

The motor driving control apparatus relating to this implementation example includes a braking target torque generator 9001, a driving parameter generator 9002, a driving waveform generator 9003, a modulator 9004, an adder 9005, a battery average current detector 9006, a current offset register 9007, and an adder 9008.

When a braking request is made by a braking operation or the like, the braking target torque generator 9001 outputs a preset braking target torque to the driving parameter generator 9002 according to the speed such as the vehicle speed. As for the braking target torque to be outputted, see, for example, the International Publication WO 2012/086459 A1. This International Publication and corresponding US patent application are incorporated herein by reference.

The driving parameter generator 9002 outputs a preset lead angle and a predetermined average duty cycle according to the speed and the braking target torque.

The lead angle and the predetermined average duty cycle to be outputted by the driving parameter generator 9002 will be explained with reference to FIGS. 2A to 3B.

Figure 2A:
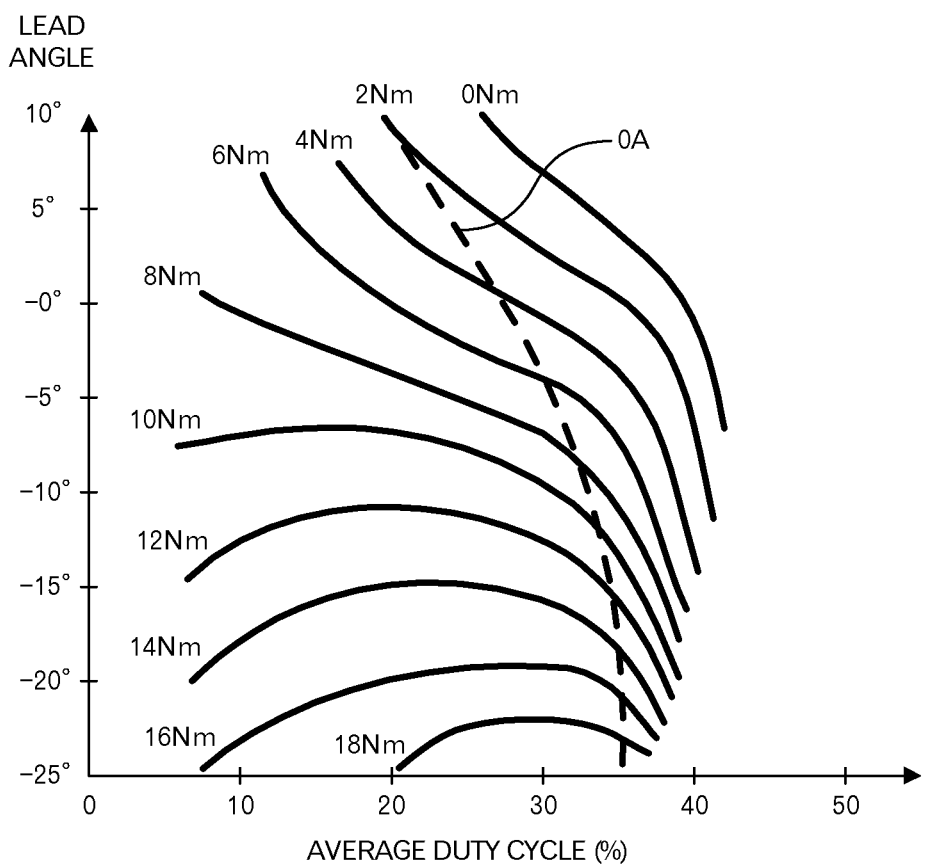
FIG. 2A is a diagram depicting a relationship of torques with respect to a combination of an average duty cycle and a lead angle in the vector control.

In FIG. 2A, the horizontal axis represents the average duty cycle and the vertical axis represents the lead angle. At a certain motor rotation speed (for example, 2400 rpm), the combination of the average duty cycle and the lead angle at which the same torque occurs is depicted as a contour line for the torque. Specifically, the contour lines for the torque are depicted every 2 Nm from 0 Nm to 18 Nm. It is to be noted that the battery and the inverter unit for driving the motor are still connected and the range is measured where the intensifying field current method in which the field current flows with a phase difference of −90 degrees with respect to the torque current can be adopted.

Figure 2B:
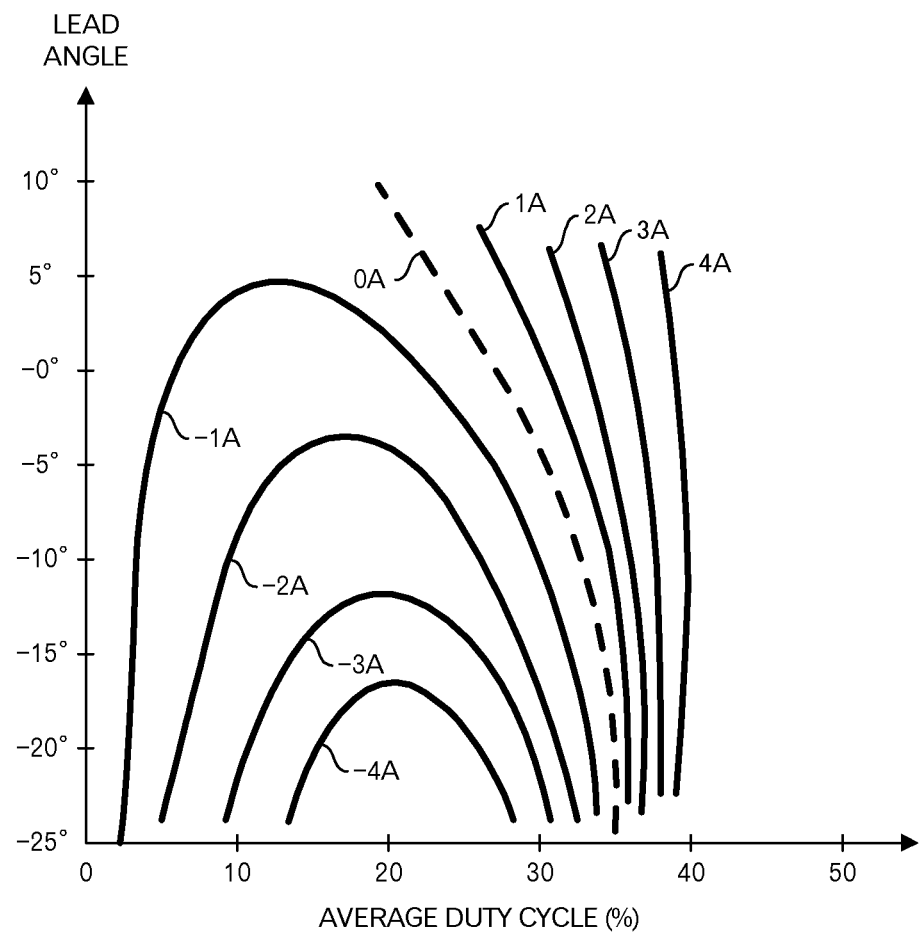
FIG. 2B is a diagram depicting a relationship of the power source (battery) current with respect to the combination of the average duty cycle and the lead angle in the vector control.

On the other hand, in FIG. 2B, the horizontal axis represents the average duty cycle and the vertical axis represents the lead angle. FIG. 2B depicts as a contour line for the current, the combinations of the average duty cycle and the lead angle, through which the same current flows into the battery at a certain motor rotation speed (for example, 2400 rpm). Specifically, the contour lines for the current from 0 A (dotted line) in which the current does not flow to 4 A in which the current flows from the battery in the discharging direction and the contour lines for the current up to −4 A in which the current flows into the battery in the charging direction (also referred to as the regenerative direction) for each 1 A. Again, the battery and the inverter remain connected, and the same range as in FIG. 2A is measured.

The dotted line in FIG. 2B represents the combination of the average duty cycle and the lead angle at which no current flows and is also depicted in FIG. 2A. Since the loss braking corresponds to a state of 0 A at which the battery is not discharged nor charged, an average duty cycle and lead angle, which enables the loss braking, and the braking torque in such a case are specified in FIG. 2A, from the points where the dotted line representing 0 A and the contour line for the torque intersect each other.

Figure 3A:
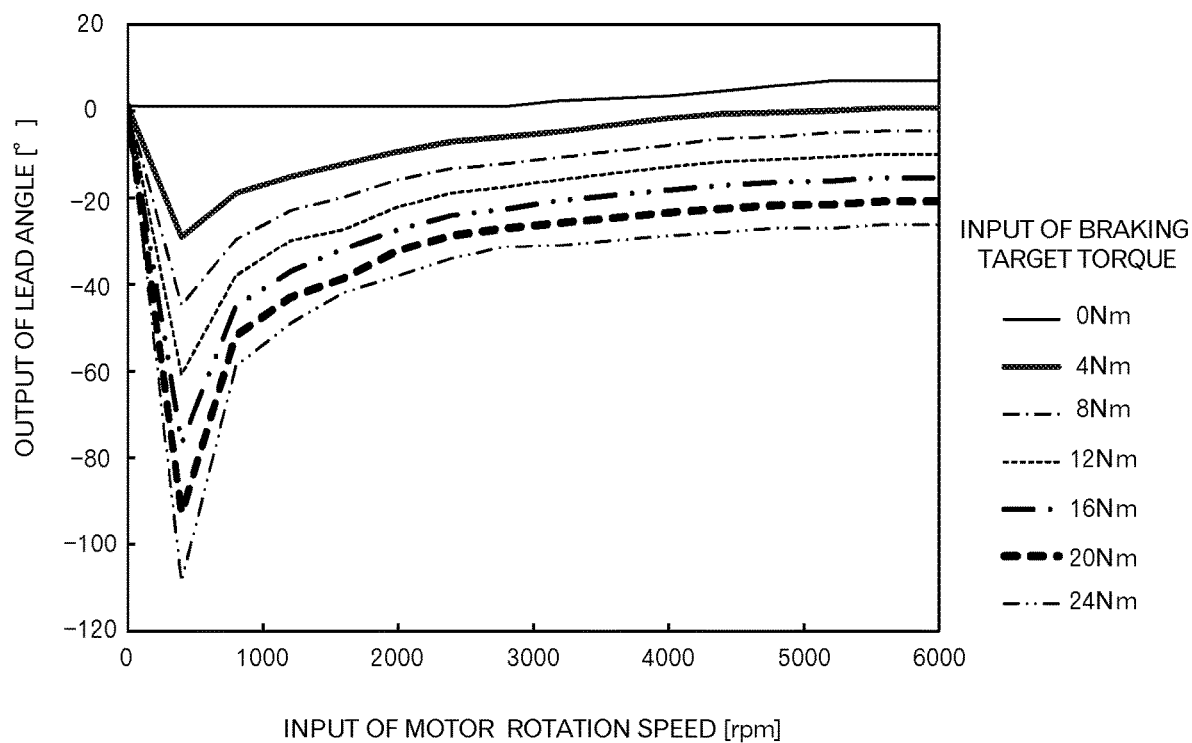
FIG. 3A is a diagram depicting a relationship among the motor rotation speed and the braking torque and the lead angle.
Figure 3B:
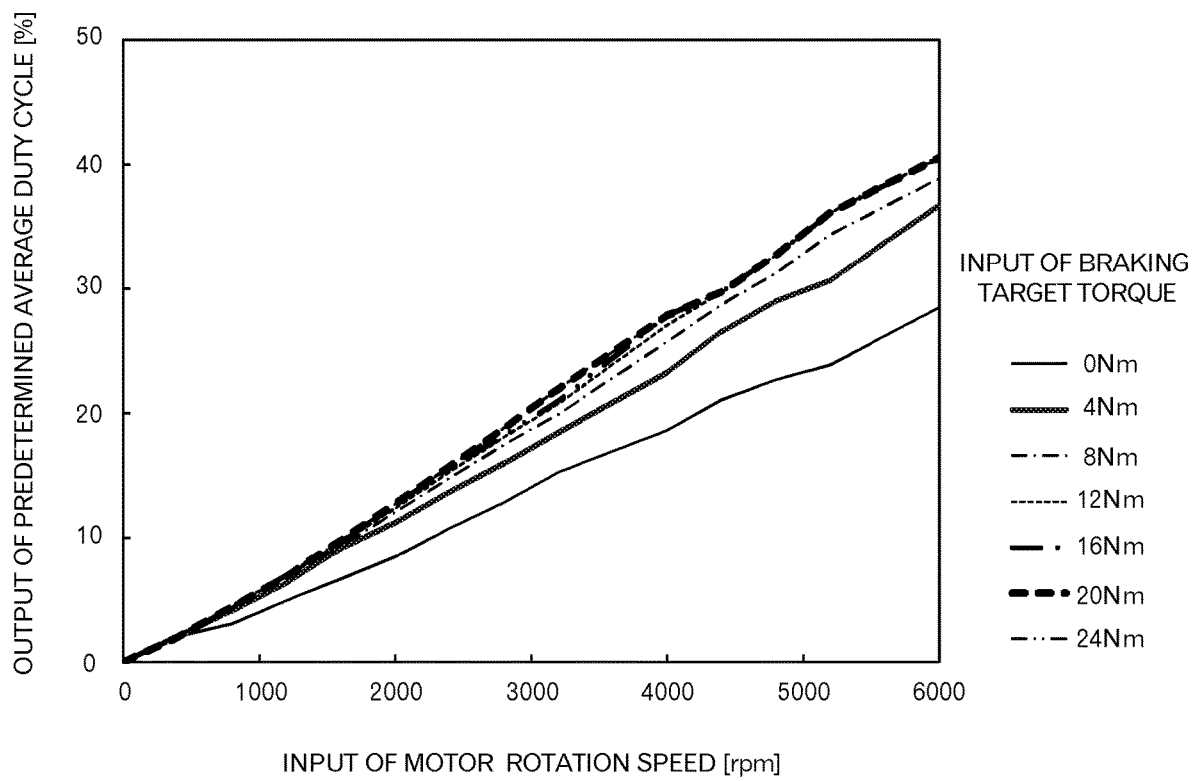
FIG. 3B is a diagram depicting a relationship among the motor rotation speed and the braking torque and a predetermined average duty cycle.

By doing this for each speed, the relationships as depicted in FIG. 3A and FIG. 3B are obtained.

FIG. 3A depicts the relationship among the motor rotation speed and the braking torque and the lead angle, and FIG. 3B depicts the relationship among the motor rotation speed and the braking torque and the predetermined average duty cycle.

Based on FIGS. 3A and 3B, the driving parameter generator 9002 outputs the lead angle and the predetermined average duty cycle, which correspond to the inputted speed (equivalent to the motor rotation speed) and the braking target torque.

When the inverter is driven in accordance with the lead angle and the predetermined average duty cycle, which were outputted by the driving parameter generator 9002, the loss braking is realized basically. However, due to variations and fluctuations of constants of respective elements, the regenerative current does not become zero. Therefore, the feedback control is performed so that the regenerative current becomes zero.

The battery average current detector 9006 detects the average value of the current flowing into the battery and outputs a value according to the average value. The adder 9008 adds the output of the battery average current detector 9006 and the output of the current offset register 9007 (the value one unit time ago. However, the initial value is zero, for example), and outputs the addition result to the current offset register 9007. The current offset register 9007 stores the output of the adder 9008. In this way, a value according to the average value of the current detected by the battery average current detector 9006 is accumulated in the current offset register 9007.

Then, the adder 9005 subtracts the value accumulated in the current offset register 9007 from the predetermined average duty cycle from the driving parameter generator 9002. As a result, the average value of the current flowing into the battery is negatively fed back. The corrected average duty cycle generated by the adder 9005 is outputted to the driving waveform generator 9003.

Based on the lead angle from the driving parameter generator 9002 and the corrected average duty cycle from the adder 9005, the driving waveform generator 9003 generates signals with waveforms, for example, a sinusoidal wave having this lead angle and an amplitude corresponding to the corrected average duty cycle to output the signals to the modulator 9004. In the case of a three-phase motor, the signals generated by the driving waveform generator 9003 represent instantaneous duty cycles of the three-phase driving waveform Du, Dv and Dw.

The modulator 9004 performs, for example, PWM modulation according to the outputs of the driving waveform generator 9003, and outputs switching signals to the switches included in the inverter.

As mentioned above, the current flowing into the battery is negatively fed back so that the current flowing in the battery is controlled to be zero. However, the current does not become zero at every moment and it will fluctuate somewhat around zero.

EMBODIMENT

In the embodiment of the present invention, the loss braking is realized completely without passing a regenerative current into a battery.

Hereinafter, an embodiment of the present invention will be described with reference to an example of a motor-assisted bicycle. However, the application target of the embodiment of the present invention is not limited to only the motor-assisted bicycle.

Figure 4:
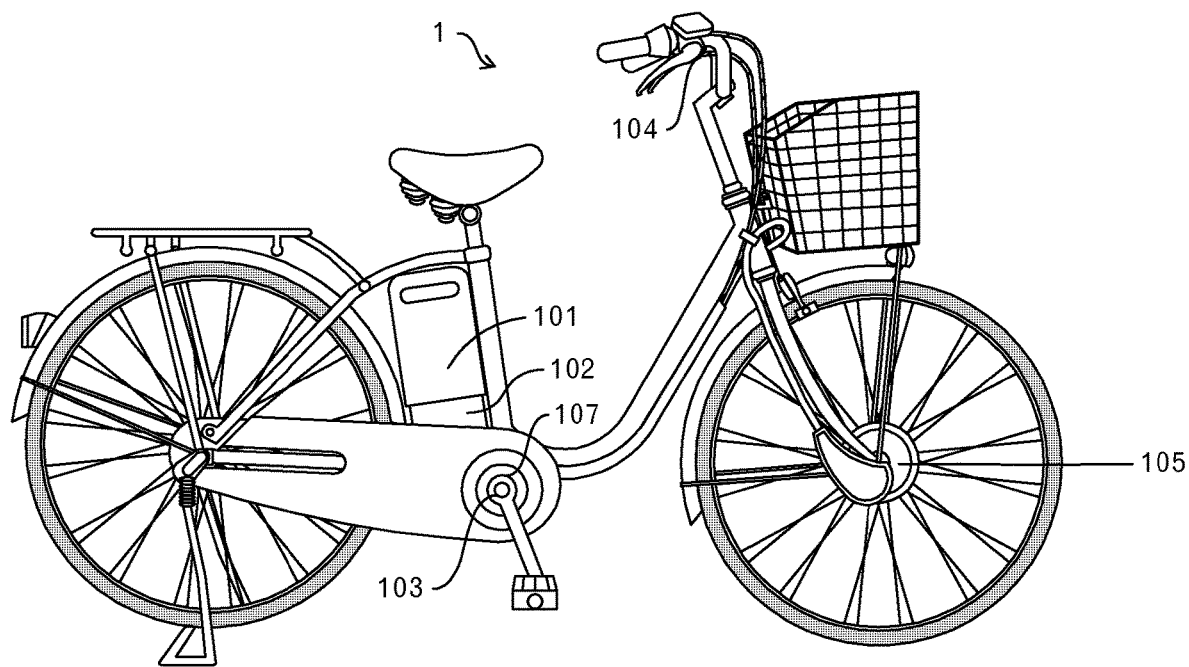
FIG. 4 is a diagram depicting an exterior view of a motor-assisted bicycle.

FIG. 4 is an external view depicting an example of a motor-assisted bicycle which is a motor-assisted vehicle in the present embodiment. The motor-assisted bicycle 1 is equipped with a motor driving apparatus. The motor driving apparatus includes a rechargeable battery 101 (original power source), a motor driving control apparatus 102, a pedal torque sensor 103, a pedal rotation sensor 107, a brake sensor 104, and a motor 105. The motor-assisted bicycle 1 also has a control panel, a freewheel and a transmission.

Although the rechargeable battery 101 is a lithium ion rechargeable battery, other types of batteries such as a lithium ion polymer rechargeable battery, a nickel hydrogen power storage battery, and the like may be used.

The pedal torque sensor 103 is provided on a wheel attached to the crankshaft, detects the pedaling force of the pedal by the driver, and outputs the detection result to the motor driving control apparatus 102. Similarly to the pedal torque sensor 103, the pedal rotation sensor 107 is provided on a wheel attached to the crankshaft, and outputs a pulse signal corresponding to the rotation to the motor driving control apparatus 102.

The motor 105 is, for example, a well-known three-phase brushless motor, and is mounted on, for example, the front wheel of the motor-assisted bicycle 1. The motor 105 rotates the front wheels and the rotor is connected to the front wheels directly or via a speed reducer or the like so that the rotor rotates according to the rotation of the front wheels. Further, the motor 105 is provided with a rotation sensor such as a hall element and outputs the rotation information (that is, hall signal) of the rotor to the motor driving control apparatus 102.

The brake sensor 104 detects the brake operation of the driver and outputs a signal concerning the brake operation to the motor driving control apparatus 102.

Figure 5:
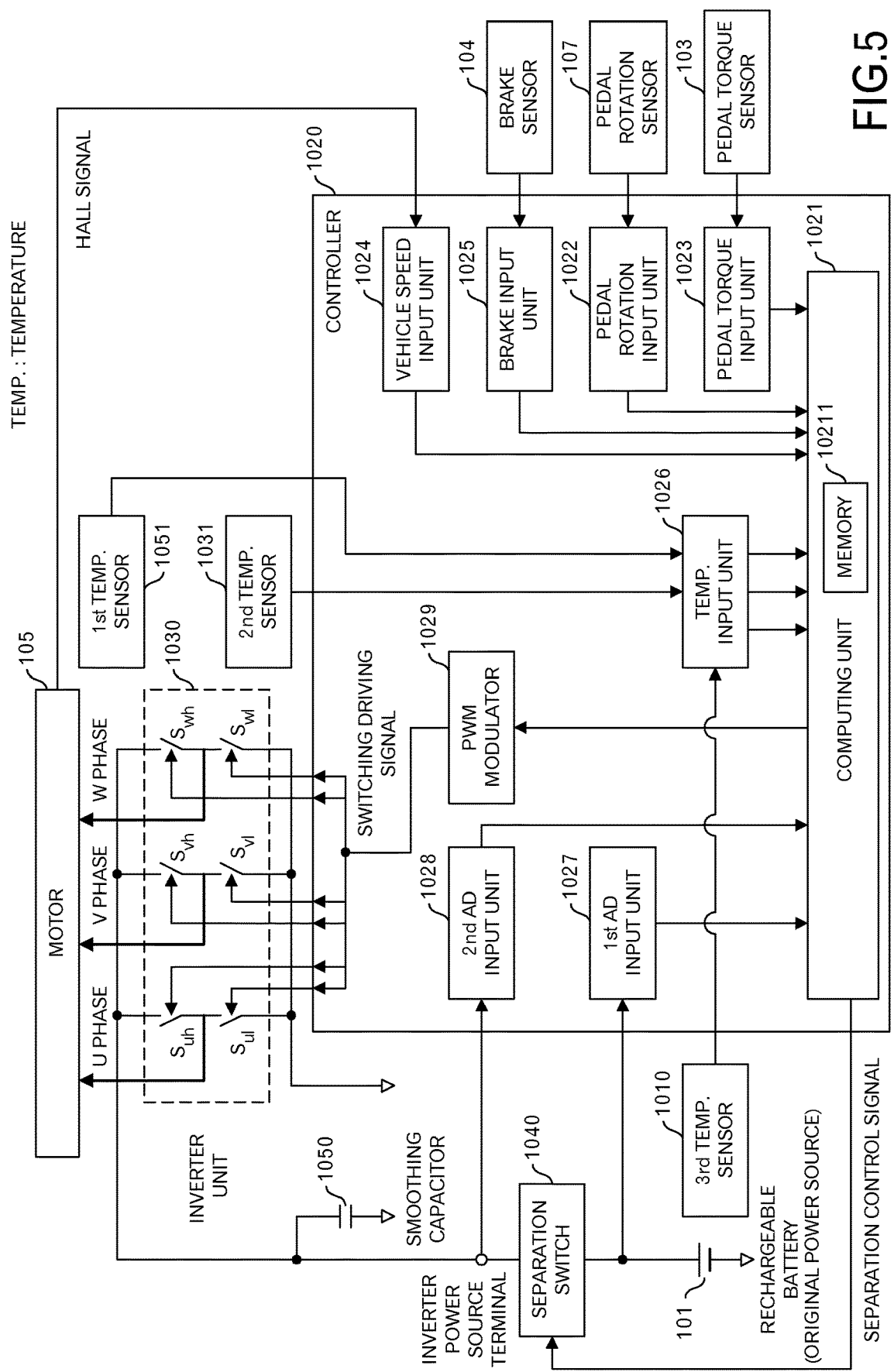
FIG. 5 is a functional block diagram of a motor driving control apparatus.

FIG. 5 depicts a configuration related to the motor driving control apparatus 102 of the motor-assisted bicycle 1. The motor driving control apparatus 102 includes a controller 1020, an inverter unit 1030, a separation switch 1040, and a smoothing capacitor 1050. The inverter unit 1030 is provided with a high side FET (Suh) and a low side FET (Sul) that perform switching on the U phase of the motor 105, a high side FET (Svh) and a low side FET (Svh) that perform switching on the V phase of the motor 105 (Svl), and a high-side FET (Swh) and a low-side FET (Swl) that perform switching on the W phase of the motor 105. High side may be called upper side, and low side may be called lower side. The inverter unit 1030 is provided with a second temperature sensor 1031, and the motor 105 is provided with a first temperature sensor 1051, which are connected to the controller 1020, respectively.

In addition, the inverter unit 1030 is connected to one end of the smoothing capacitor 1050, and the other end of the smoothing capacitor 1050 is grounded. The capacity of the smoothing capacitor 1050 is relatively large and larger than that of the capacitor (not depicted in FIG. 5) that may be provided on the rechargeable battery 101 side of the separation switch 1040.

The separation switch 1040 is provided between the inverter unit 1030 and the rechargeable battery 101 and works so as to separate the rechargeable battery 101 from the inverter unit 1030 in response to an instruction (a separation control signal) from the controller 1020. Note that the rechargeable battery 101 is provided with a third temperature sensor 1010 and the third temperature sensor 1010 is connected to the controller 1020.

Further, the controller 1020 includes a computing unit 1021, a vehicle speed input unit 1024, a brake input unit 1025, a pedal rotation input unit 1022, a pedal torque input unit 1023, a temperature input unit 1026, a first AD (Analog/Digital) input unit 1027, a second AD input unit 1028, and a PWM modulator 1029. Note that the controller 1020 also includes a carrier generator that outputs a carrier signal to the PWM modulator 1029, however this is not depicted here.

The computing unit 1021 uses an input from the pedal rotation input unit 1022, an input from the pedal torque input unit 1023, an input from the vehicle speed input unit 1024, an input from the brake input unit 1025, an input from the first AD input unit 1027, an input from the second AD input unit 1028 and an input from the temperature input unit 1026 to perform computation described below, and outputs a signal to the PWM modulator 1029.

It should be noted that the computing unit 1021 has a memory 10211, and the memory 10211 stores various data to be used for computing operations, data being processed, and the like. Furthermore, the computing unit 1021 may be realized by a processor executing a program, and in this case, the program may be recorded in the memory 10211. In addition, the memory 10211 may be provided separately from the computing unit 1021.

The pedal rotation input unit 1022 digitizes a signal representing the pedal rotation phase angle and the rotation direction from the pedal rotation sensor 107 and outputs the digitized signal to the computing unit 1021. The vehicle speed input unit 1024 calculates the current vehicle speed from the hall signal outputted from the motor 105 and outputs it to the computing unit 1021. The pedal torque input unit 1023 digitizes a signal corresponding to the pedaling force from the pedal torque sensor 103 and outputs it to the computing unit 1021. In response to a signal from the brake sensor 104, the brake input unit 1025 outputs a signal representing either of a braking-less state in which a signal representing the presence of the braking is not received from the brake sensor 104 and a braking state in which a signal representing the presence of the braking is received from the brake sensor 104 to the computing unit 1021. The temperature input unit 1026 digitizes the temperature information from the first temperature sensor 1051, the second temperature sensor 1031, and the third temperature sensor 1010, and outputs the digitized temperature information to the computing unit 1021. The first AD input unit 1027 digitizes the voltage of the rechargeable battery 101 side of the separation switch 1040, that is, the output voltage of the rechargeable battery 101, and outputs it to the computing unit 1021. The second AD input unit 1028 digitizes the voltage on the inverter unit 1030 side of the separation switch 1040 and outputs it to the computing unit 1021.

In order to facilitate the following explanation, the terminal of the separation switch 1040 on the inverter unit 1030 side will be referred to as an inverter power source terminal, and the voltage at this inverter power source terminal will be referred to as the inverter power source voltage.

Further, from the rechargeable battery 101, not only the temperature information from the third temperature sensor 1010 but also the information on the charge level including the full charge state and the signal representing that the charging is disabled due to other reasons may be also transmitted to the controller 1020.

In the present embodiment, in the loss braking mode in which the braking torque is generated without passing the regenerative current to the original power source such as the rechargeable battery 101, the separation switch 1040 is turned off and the original power source such as the rechargeable battery 101 and the like is separated from the inverter unit 1030 to generate a braking torque by a driving control method described below. This ensures that the regenerative current to the original power source such as the rechargeable battery 101 becomes zero, and then a signal (a first signal) with an appropriate waveform (the waveform specified by the waveform, the lead angle, the amplitude of the fundamental waveform) is generated, and a switching driving signal (a second signal) is generated based on that signal to cause the inverter unit 1030 to perform the switching, whereby arbitrary braking torque can be obtained.

Here, a variation of the separation switch 1040 which is a main function in the loss braking mode will be described with reference to FIGS. 6A to 6E. First, the separation controller 2100, which outputs the separation control signal to the separation switch 1040 and is implemented in the computing unit 1021, will be described with reference to FIG. 6A.

The separation controller 2100 that is realized in the computing unit 1021 detects the loss braking mode (an event in which the loss braking should be performed) based on various inputs such as the temperature of the rechargeable battery 101, the state in which the rechargeable battery 101 is fully charged, and other notifications of the charging-disabled state, and outputs a separation control signal to turn off the separation switch 1040.

Figure 8:
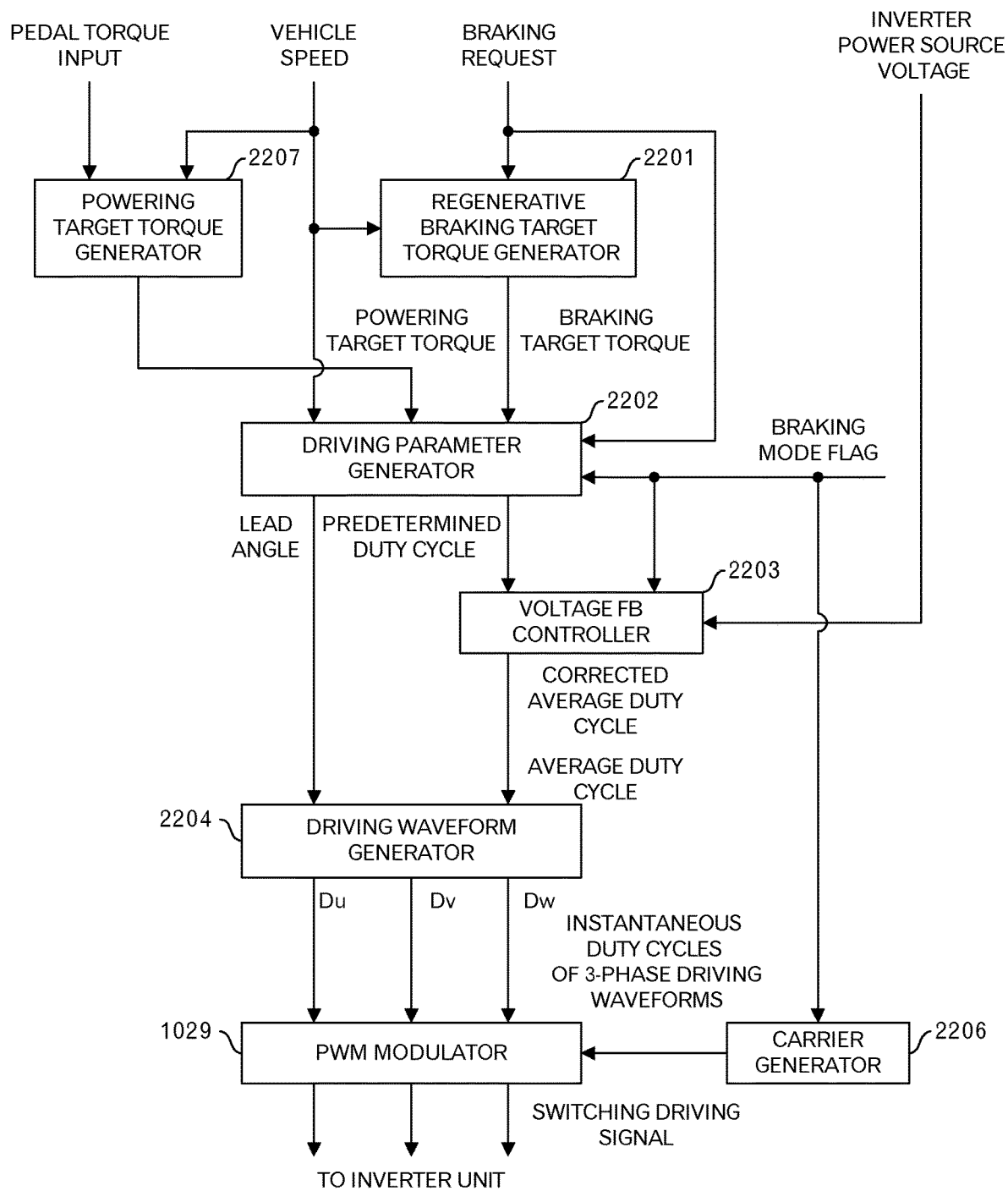
FIG. 8 is a diagram depicting a functional configuration example relating to a first embodiment.

Note that the powering target torque calculated in, for example, the computing unit 1021 (for example, the powering target torque generator 2207, 2314 or the like as depicted in FIG. 8) may be inputted into the separation controller 2100, and as will be described, when the powering target torque becomes equal to or less than a threshold value, the separation controller 2100 outputs a separation control signal to turn off the separation switch 1040. Even when batteries, circuits and the like are to be protected due to other factors, separation control signals to turn off the separation switch 1040 may be outputted.

Further, when the separation controller 2100 detects the loss braking mode, the separation controller 2100 also instructs the loss braking mode even with the braking mode flag. On the other hand, when the separation controller 2100 determines that the regenerative braking mode is selected instead of the loss braking mode from various inputs, the separation controller 2100 outputs a signal to instruct the regenerative braking mode. Similarly, when detecting the regenerative braking mode, the separation controller 2100 also instructs the regenerative braking mode even with the braking mode flag. According to the braking mode flag, the PWM carrier frequency, the modulation type of PWM modulation, the calculation switching of the average duty cycle and the lead angle at the time of the mode switching and the like are performed.

FIGS. 6B to 6E, which will be explained below, depicts only the rechargeable battery 101, the separation switch 1040, the inverter unit 1030 and the components related thereto, which are depicted on the left side of FIG. 5.

Figure 6A:
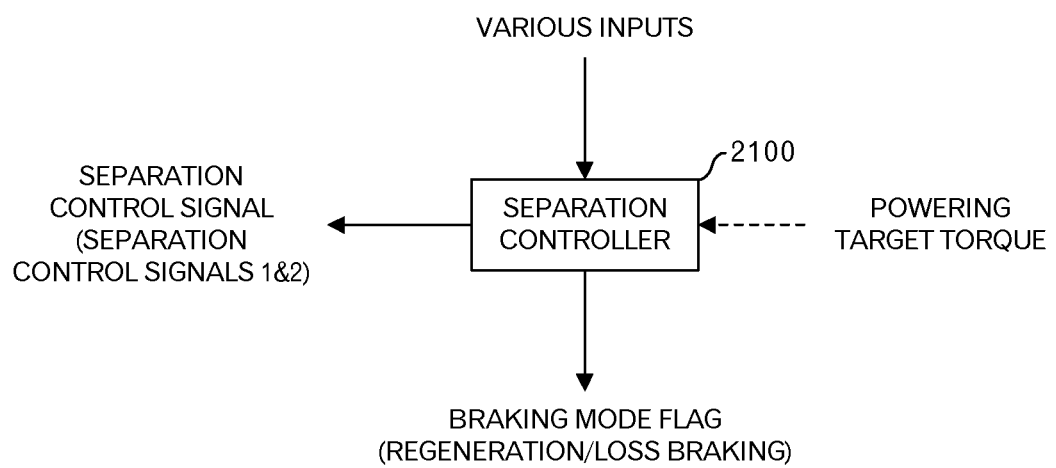
FIG. 6A is a diagram depicting a separation controller realized by a computing unit.
Figure 6B:
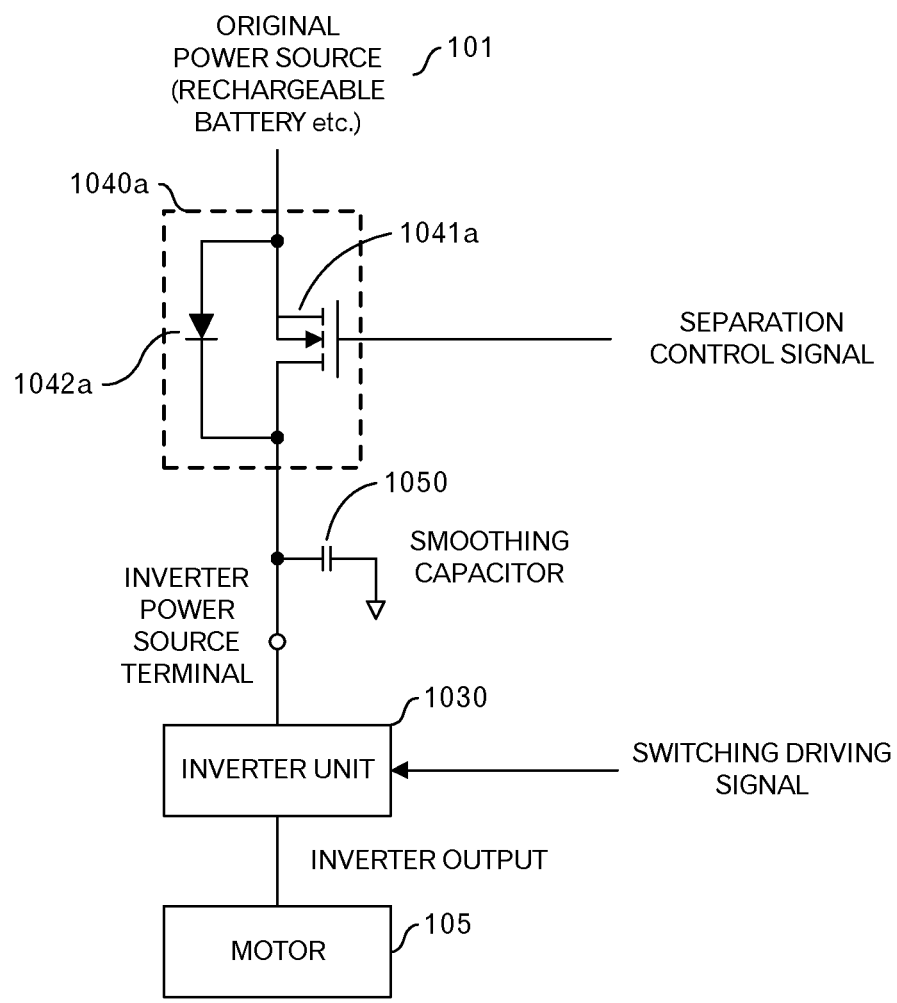
FIG. 6B is a diagram depicting a first example of a separation switch.

FIG. 6B depicts an example in which the separation switch 1040a includes an N-channel MOSFET 1041a and a diode 1042a. That is, the source of the MOSFET 1041a is connected to the original power source such as the rechargeable battery 101, and the drain thereof is connected to the smoothing capacitor 1050 and the inverter unit 1030. Further, the anode of the diode 1042a is connected to the original power source such as the rechargeable battery 101, and the cathode thereof is connected to the smoothing capacitor 1050 and the inverter unit 1030. The diode 1042a may be a parasitic diode or a diode itself may be connected. The gate of the MOSFET 1041a is connected to the computing unit 1021.

When the MOSFET 1041a is turned off in accordance with the separation control signal, the current from the inverter unit 1030 to the original power source such as the rechargeable battery 101 is cut off. However, during that time, if the voltage of the original power source such as the rechargeable battery 101 or the like is higher than the inverter power source voltage, the current from the original power source such as the rechargeable battery 101 flows through the diode 1042a.

Such a separation switch 1040a may be provided for other purposes in some cases. That is, when the motor 105 over-rotates and the counter electromotive force exceeds the output voltage of the rechargeable battery 101, the separation switch 1040a is used to prevent, by turning off the separation switch 1040a, from applying unnecessary regenerative braking when there is no intention of the regenerative braking and to protect the battery. In addition, by forcibly turning off even in the event of the abnormality of a battery, circuit, or the like, the battery or circuit is protected.

Figure 6C:
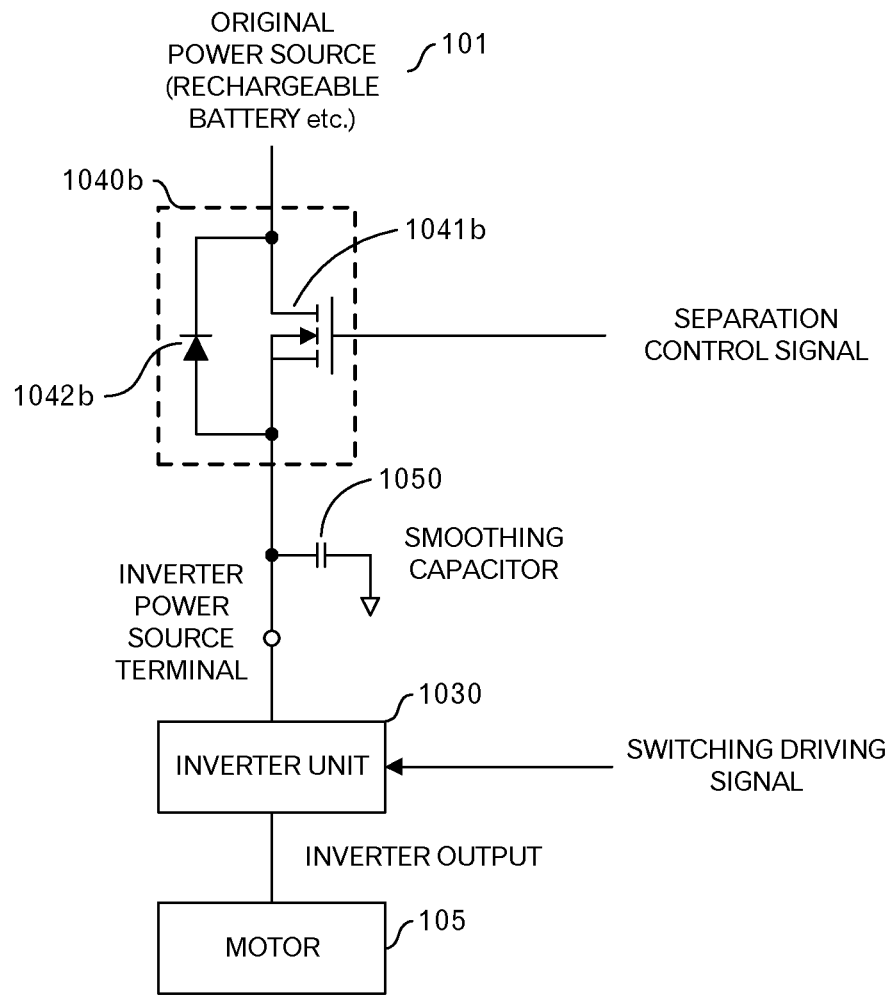
FIG. 6C is a diagram depicting a second example of the separation switch.

FIG. 6C depicts an example in which the separation switch 1040b includes an N-channel MOSFET 1041b and a diode 1042b. That is, the drain of the MOSFET 1041b is connected to the original power source such as the rechargeable battery 101, and the source thereof is connected to the smoothing capacitor 1050 and the inverter unit 1030. Further, the cathode of the diode 1042b is connected to an original power source such as the rechargeable battery 101, and the anode thereof is connected to the smoothing capacitor 1050 and the inverter unit 1030. The diode 1042b may be a parasitic diode or a diode itself may be connected. The gate of the MOSFET 1041b is connected to the computing unit 1021.

When the MOSFET 1041b is turned off in response to the separation control signal, the current from the inverter unit 1030 to the original power source such as the rechargeable battery 101 is cut off. However, even if the MOSFET 1041b is turned off in response to the separation control signal, when the inverter power supply voltage is higher than the voltage of the original power source such as the rechargeable battery 101 or the like, the current flows from the inverter unit 1030 via the diode 1042b to the original power source such as the rechargeable battery 101.

Such a separation switch 1040b may also be provided for other purposes. That is, by gradually extending the period of turning on the separation switch 1040b after attaching the rechargeable battery 101, the destruction of the inverter unit 1030 by passing a huge rush current to the inverter unit 1030 side is prevented until the inverter power supply voltage becomes sufficiently high.

Figure 6D:
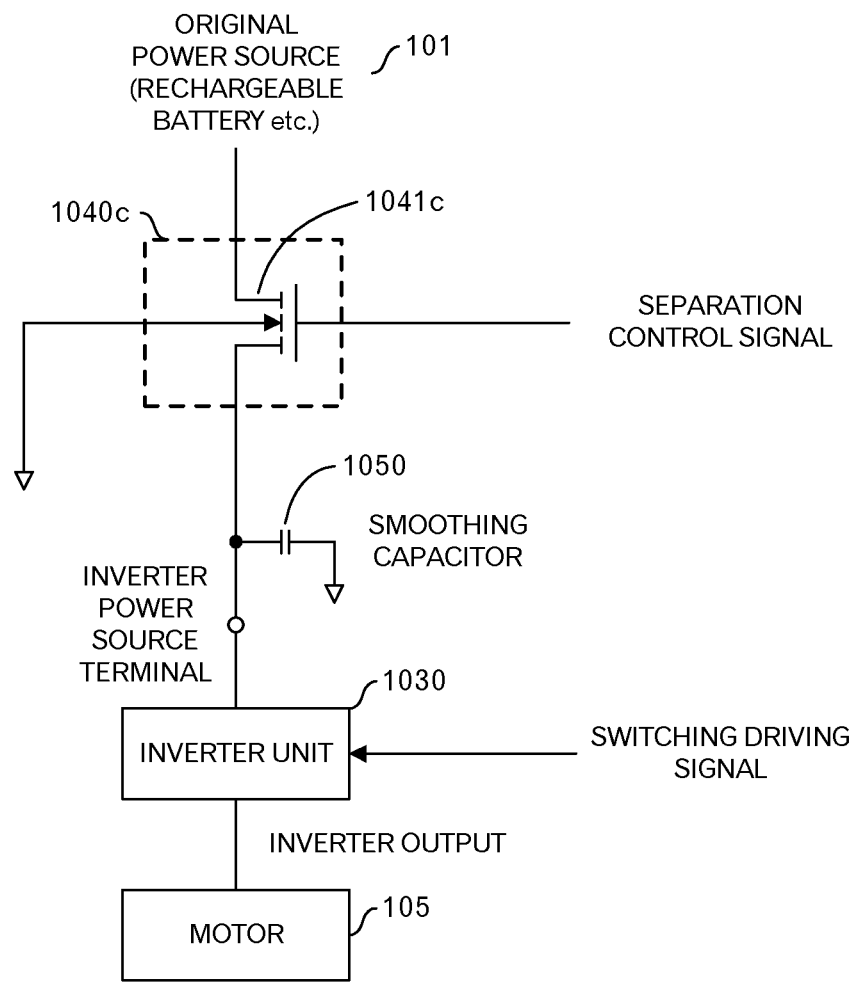
FIG. 6D is a diagram depicting a third example of the separation switch.
Figure 6E:
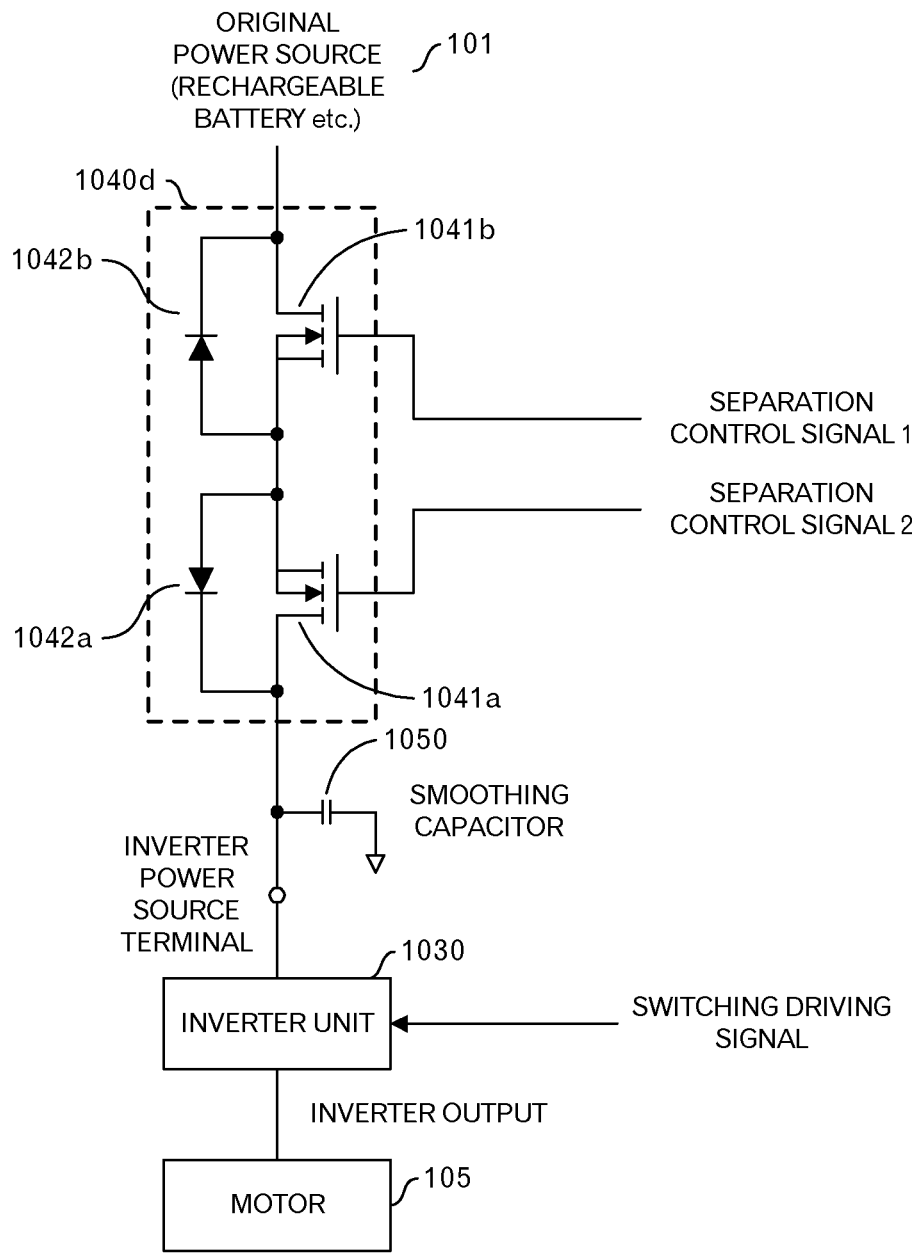
FIG. 6E is a diagram depicting a fourth example of the separation switch.

FIG. 6D depicts an example of the separation switch 1040c, which is a switch that has no parasitic diode and can cut off bidirectional currents. That is, a switch for simultaneously cutting off the current from the rechargeable battery 101 to the inverter unit 1030 and the current from the inverter unit 1030 to the rechargeable battery 101 is used. Such a switch may be realized by a single switch, but as depicted in FIG. 6E, it may be realized by using MOSFETs 1041a and 1041b in combination. That is, the separation switch 1040d includes diodes 1042a and 1042b, and a MOSFET 1041a and a MOSFET 1041b. Then, when the MOSFET 1041a and the MOSFET 1041b are connected in series and simultaneously turned off, the bidirectional current can be cut off. However, the connection order of the MOSFET 1041a and the MOSFET 1041b may be reversed.

In the case of FIG. 6E, if the MOSFET 1041a is turned off while the MOSFET 1041b is kept on, it acts in the same way as in FIG. 6B. In addition, if the MOSFET 1041b is turned off while the MOSFET 1041a is kept on, it acts in the same way as in FIG. 6C.

Although an example in which an N-channel MOSFET is used for the separation switch 1040 has been described, a switching element such as a P-channel MOSFET, a junction FET, a bipolar transistor, an IGBT (Insulated Gate Bipolar Transistor), a relay, or the like may be used.

Figure 7A:
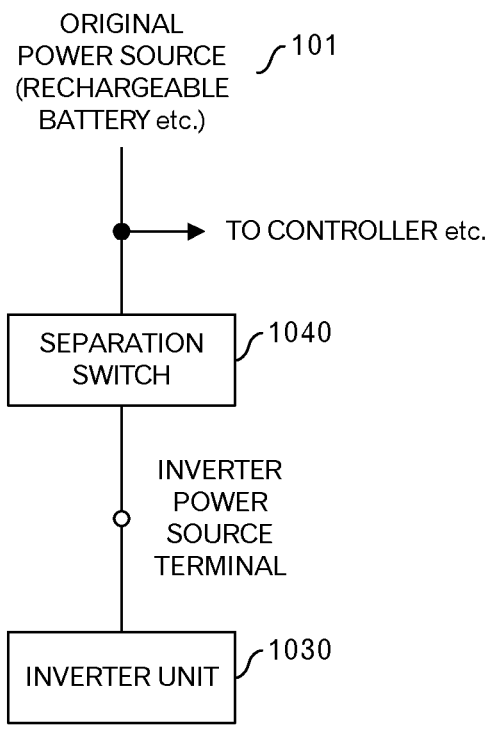
FIG. 7A is a diagram depicting a first example of a power source connection method.
Figure 7B:
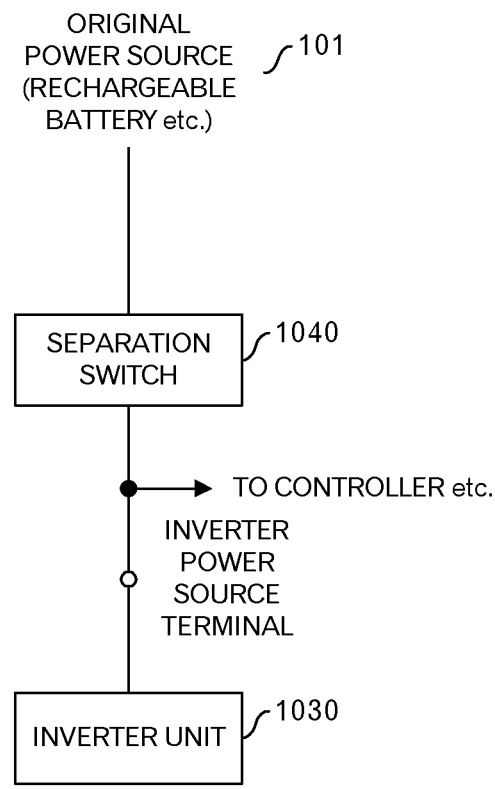
FIG. 7B is a diagram depicting a second example of the power source connection method.
Figure 7C:
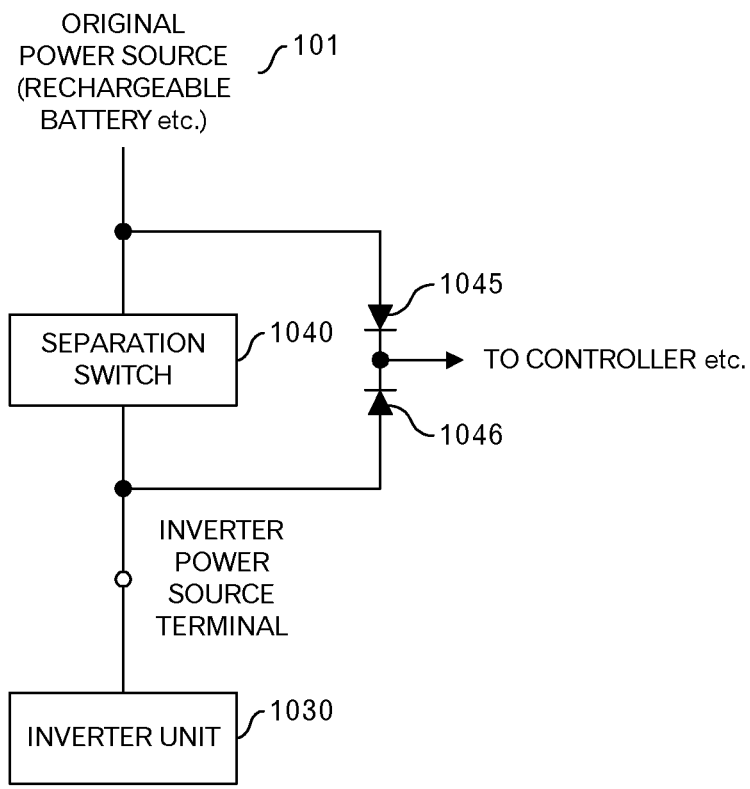
FIG. 7C is a diagram depicting a third example of the power source connection method.

In FIG. 5, the description of how to obtain the power source of the controller 1020 and the like is omitted. With reference to FIGS. 7A to 7C, a variation of a method of obtaining a power source of the controller 1020 and the like will be described. In addition to the controller 1020, a lamp and the like which are connected to an apparatus such as the motor-assisted bicycle 1, in which the motor is installed, and which consumes the electric power may be included. In addition, there are cases in which connections as depicted in FIGS. 7A to 7C are made for the lamp and the like.

In the example of FIG. 7A, the controller 1020 and the like obtain the power from the rechargeable battery 101 side of the separation switch 1040. If the rechargeable battery 101 is in a dischargeable state, a relatively stable voltage can be obtained.

In the example of FIG. 7B, the controller 1020 and the like obtain the power from the inverter unit 1030 side of the separation switch 1040. Even if the rechargeable battery 101 is fully discharged, the power can be obtained by the power generation by the motor 105 and reverse boosting effect by the inverter unit 1030. In addition, it is also possible to charge the rechargeable battery 101 by properly controlling the regeneration of the inverter unit 1030. However, there is a problem in the stability, and there are cases where it is necessary to take measures against the high voltage.

In the example of FIG. 7C, by connecting the anode of the diode (the diode 1045 or 1046 in FIG. 7C) to both sides of the separation switch 1040 and connecting the cathodes of the diodes 1045 and 1046 to the controller 1020 and the like to configure the diode OR, the electric power is supplied to the controller 1020 and the like with the higher one of the output voltage of the rechargeable battery 101 and the inverter power source voltage. When the rechargeable battery 101 is connected and dischargeable or the motor-assisted bicycle 100 is running, the power is obtained, and charging can be performed by regeneration even when there is no battery remaining amount. However, it may be necessary to take measures against the high voltage.

First Embodiment

Here, a configuration for performing more appropriate loss braking on the premise that the switch depicted in FIG. 6D or FIG. 6E is adopted as the separation switch 1040 will be described with reference to FIGS. 8 to 11.

FIG. 8 illustrates a functional block configuration example realized by the computing unit 1021 in the present embodiment.

The loss braking control function realized by the computing unit 1021 includes a regenerative braking target torque generator 2201, a driving parameter generator 2202, a voltage FB controller 2203 (FB: feedback), and a driving waveform generator 2204, and controls the PWM modulator 1029 and the carrier generator 2206. Note that the computing unit 1021 includes a powering target torque generator 2207 and also performs powering driving in cooperation with the driving parameter generator 2202. The powering target torque generator 2207 generates the powering target torque according to the pedal torque input and the vehicle speed and outputs the generated powering target torque to the driving parameter generator 2202. When there is no braking request to be described below, the driving parameter generator 2202 generates and outputs powering parameters using the powering target torque and the vehicle speed. As for the generation of the powering target torque, for example, it is calculated by multiplying the pedal torque input by the assist ratio (however, the assist ratio may be limited depending on the vehicle speed in accordance with the law etc.). More specifically, see, for example, the International Publication WO 2012/086459 A1 or the like. This International Publication and corresponding US patent application are incorporated herein by reference. When there is a braking request, the driving parameter generator 2202 performs the following processing.

When the braking request is inputted, the regenerative braking target torque generator 2201 outputs the braking target torque to the driving parameter generator 2202 according to the vehicle speed from the vehicle speed input unit 1024. The braking request is outputted from the brake input unit 1025 by receiving a signal representing the presence of the braking from the brake sensor 104, for example. In addition, for example, the braking target torque is preset corresponding to the vehicle speed. The braking target torque may be set in association with conditions other than the vehicle speed. As for the braking target torque, see, for example, the International Publication WO 2012/086459 A1. In addition, please see International Publication WO 2014/200081 A1 or the like as for the braking target torque when the automatic regenerative braking is performed in case of an abrupt downward slope or occurrence of the excessive speed even if a braking instruction is not artificially given by a brake operation or the like. This International Publication and corresponding US patent application are incorporated herein by reference.

If the same braking target torque as during the regenerative braking is employed also at shifting to the loss braking, the driver can continue the operation under the same braking feeling without any discomfort. Note that the regenerative braking target torque generator 2201 may continue outputting the same braking target torque as during the regenerative braking, however, the regenerative braking target torque generator 2201 may decrease the braking target torque compared with that during the regeneration if the temperature of the motor 105, which is detected by the first temperature sensor 1051, and the temperature of the inverter unit 1030, which is detected by the second temperature sensor 1031, is excessively increased. Further, in a state where the braking target torque at shifting to the loss braking is suppressed to be low due to any reasons, the braking target torque may be gradually increased after shifting to the loss braking mode.

Upon detecting that it is in the loss braking mode by the braking mode flag, the driving parameter generator 2202 outputs a lead angle and a predetermined average duty cycle for the loss braking according to the vehicle speed and the braking target torque. On the other hand, upon detecting that it is in the regeneration mode by the braking mode flag, the driving parameter generator 2202 outputs a lead angle and a predetermined average duty cycle for the regenerative braking according to the vehicle speed and the braking target torque. As described above, when the rechargeable battery 101 is in a fully charged state, the temperature of the rechargeable battery 101 is low, or any event is detected that the regenerative current cannot be passed to the rechargeable battery 101 due to any other abnormalities, the loss braking mode is determined by the separation controller 2100 and represented by a braking mode flag. The lead angle and the predetermined average duty cycle for the loss braking will be described in detail later, but basically are set so as to obtain the braking target torque in the loss braking mode.

When the voltage FB controller 2203 detects the loss braking mode by the braking mode flag, the voltage FB controller 2203 performs feedback control to make the inverter power source voltage inputted from the second AD input unit 1028 a predetermined target voltage. However, the voltage FB controller 2203 may not be provided unless there is a problem as to the withstanding voltage of the driving circuits such as the inverter unit 1030 and the smoothing capacitor 1050. Details of the voltage FB controller 2203 will be described later.

The corrected average duty cycle, which is the output of the voltage FB controller 2203, is outputted to the driving waveform generator 2204, and the driving waveform generator 2204 uses it together with the lead angle from the driving parameter generator 2202 to make a signal of a sinusoidal wave (not limited to a sinusoidal wave, generally) that has an amplitude corresponding to the average duty cycle and the lead angle, and outputs the signal to the PWM modulator 1029. In the case of the three-phase motor, the signal generated by the driving waveform generator 2204 represents the instantaneous duty cycles Du, Dv and Dw of the three-phase driving waveform.

The PWM modulator 1029 performs PWM modulation on the outputs of the driving waveform generator 2204 based on the signal outputted from the carrier generator 2206 and outputs switching driving signals to the switching elements included in the inverter unit 1030. However, the modulation may be PNM (Pulse Number Modulation), PDM (Pulse Density Modulation), PFM (Pulse Frequency Modulation) or the like instead of PWM.

In the present embodiment, the separation switch 1040 is turned off according to the separation control signal for turning off, so that the inverter unit 1030 and the original power source such as the rechargeable battery 101 are separated from each other. In such a case, the relationship among the combination of the average duty cycle and the lead angle and the braking torque and the inverter power source voltage are as depicted in FIGS. 9A and 9B.

Figure 9A:
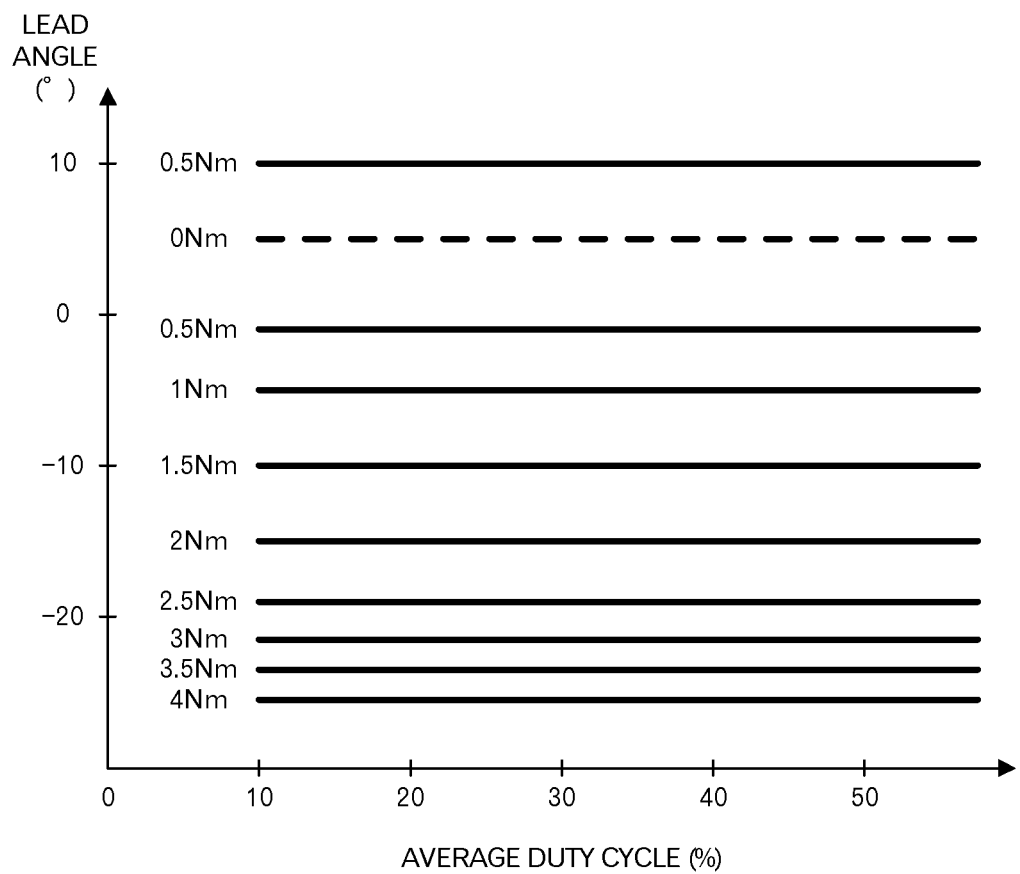
FIG. 9A is a diagram depicting a relationship between the combination of the average duty cycle and the lead angle and a braking torque.

In FIG. 9A, the vertical axis represents the lead angle and the horizontal axis represents the average duty cycle, and at a certain vehicle speed, a combination of the average duty cycle and the lead angle at which the same braking torque is generated is depicted as a contour line for the torque. Specifically, from 0.5 Nm to 4 Nm, the contour lines for the torque are depicted every 0.5 Nm. As can be seen from FIG. 9A, even if the average duty cycle changes, the braking torque does not change, and as the lead angle decreases, the braking torque increases.

Figure 9B:
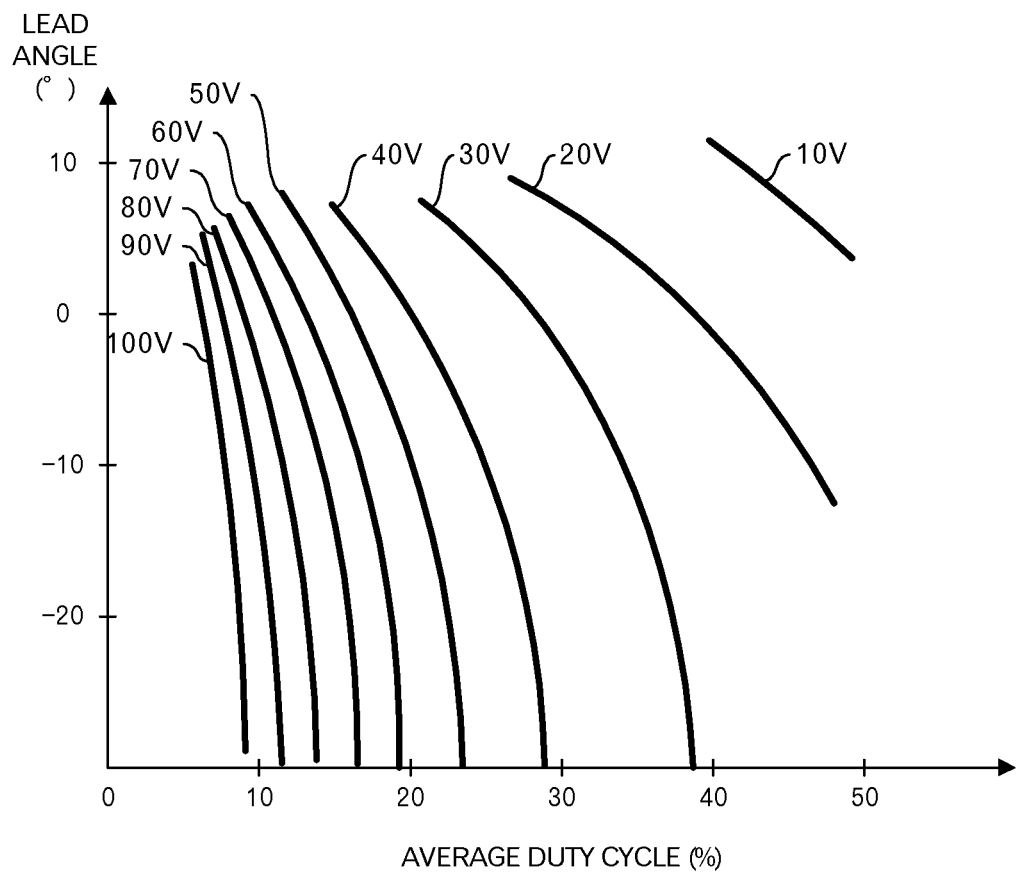
FIG. 9B is a diagram depicting a relationship between the combination of the average duty cycle and the lead angle and an inverter power source voltage.

On the other hand, in FIG. 9B, the vertical axis represents the lead angle and the horizontal axis represents the average duty cycle, and at a certain vehicle speed, a combination of the average duty cycle and the lead angle at which the same inverter power source voltage is generated is depicted as a contour line for the voltage. Specifically, from 10V to 100V, the contour lines for the voltage are depicted every 10V. As can be seen from FIG. 9B, the inverter power source voltage varies roughly in inverse proportion to the average duty cycle.

In the present embodiment, since the inverter unit 1030 and the original power source such as the rechargeable battery 101 are separated by the separation switch 1040, the regenerative current is forcibly made zero, and the inverter unit 1030 works as a boosting inverter of 1/(average duty cycle) during the regeneration. Since there is no regenerative current flowing, if the average duty cycle changes, the inverter power source voltage changes and only the braking torque according to the lead angle is generated.

FIGS. 9A and 9B depict the relationship at a certain vehicle speed, and other relationships having the aforementioned characteristics are obtained at other vehicle speeds.

Since the inverter unit 1030 and the original power source such as the rechargeable battery 101 are separated by the separation switch 1040 as described above, if the vehicle speed is given, the lead angle for obtaining the braking target torque is specified. Further, the target voltage of the inverter power source voltage may be arbitrarily set in accordance with various circumstances such as circuits (including whether the intensifying field current method or the weakening field current method is adopted). Therefore, the average duty cycle according to the target voltage of the inverter power source voltage may be specified from the vehicle speed and the lead angle.

According to FIGS. 9A and 9B, the target voltage of the inverter power source voltage need not be strictly set. In that case, instead of using the voltage FB controller 2203 as described above, the average duty cycle may be selected so that the inverter power source voltage falls within a certain range.

In this way, by adopting the separation switch 1040 that is turned off in the loss braking mode, the degree of freedom in the control for the loss braking becomes very high as compared with the case where the current feedback control is performed in the vector control to make the regenerative current zero.

Figure 10:
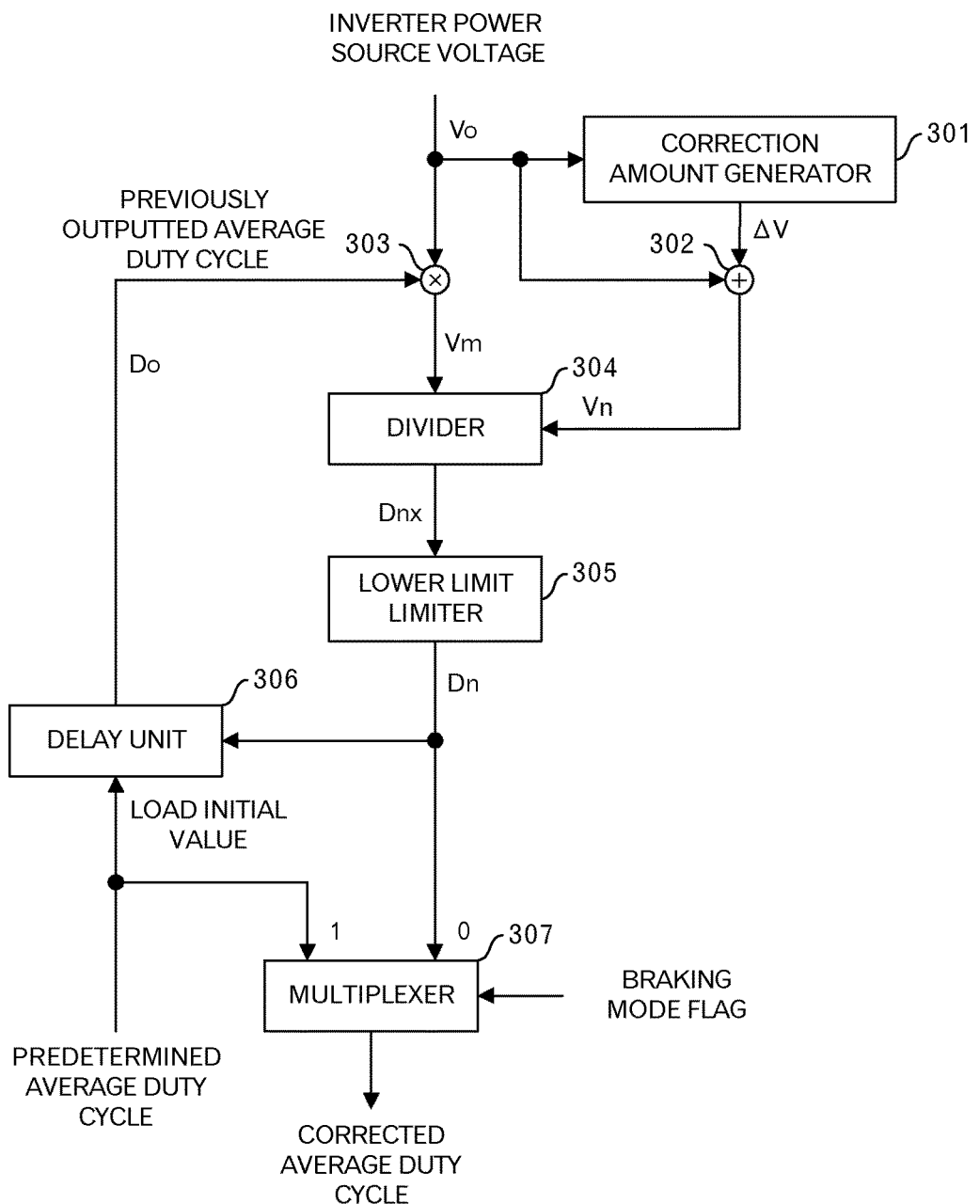
FIG. 10 is a diagram depicting a functional configuration example of a voltage FB controller.
Figure 11:
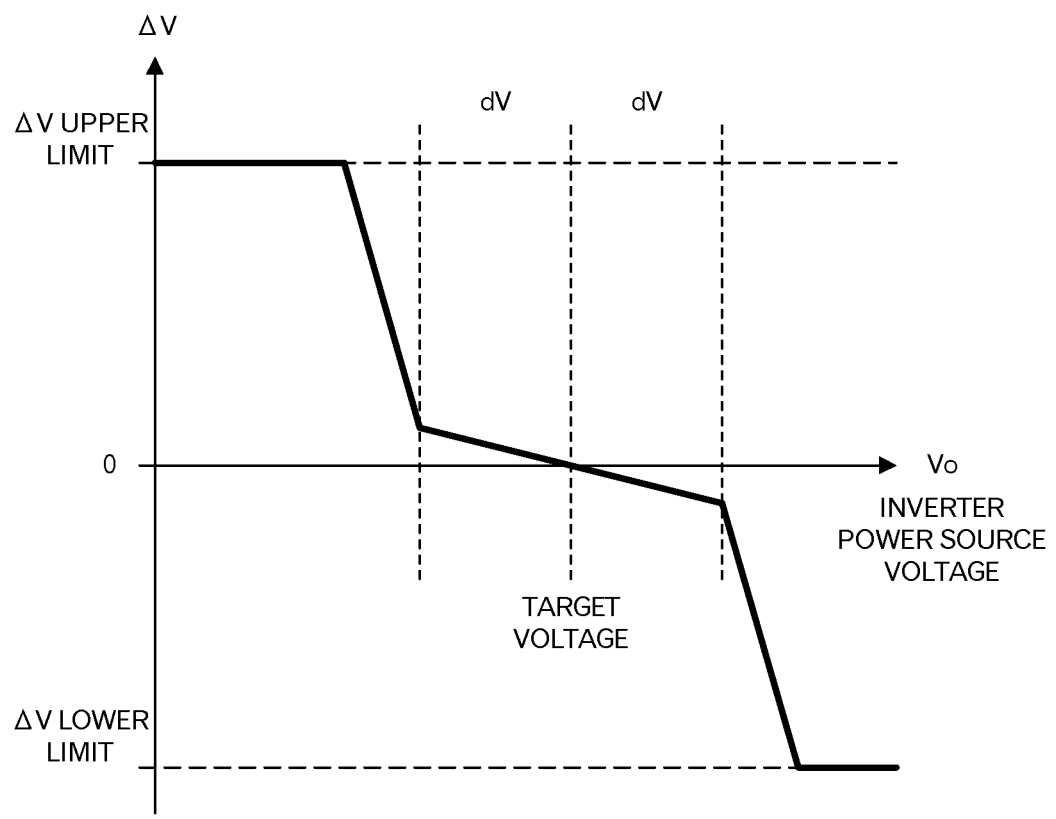
FIG. 11 is a diagram to explain generation of $\Delta V$.

A configuration example of the voltage FB controller 2203 in a case where it is preferable to perform the linear control, for example, with a constant time constant will be described with reference to FIGS. 10 and 11.

The voltage FB controller 2203 includes a correction amount generator 301, an adder 302, a multiplier 303, a divider 304, a lower limit limiter 305, a delay unit 306, and a multiplexer 307.

The correction amount generator 301 calculates the correction amount $\Delta V$ per one processing unit time (frame) from the inverter power source voltage Vo. The correction amount $\Delta V$ is determined in accordance with, for example, FIG. 11. In FIG. 11, the horizontal axis represents the inverter power source voltage Vo and the vertical axis represents $\Delta V$. As can be seen from FIG. 11, if the inverter power source voltage is within the width of plus or minus dV from the target voltage of the inverter power source voltage, $\Delta V$ changes with a small slope, and when the inverter power source voltage oversteps from this width, $\Delta V$ suddenly changes to $\Delta V$ upper limit or $\Delta V$ lower limit. That is, when the inverter power source voltage is not so far away from the target voltage, the negative feedback is performed with a small gain, and when it is greatly diverged, the negative feedback is performed with a large gain. However, such a curve is an example, and a simple straight line may be adopted.

The adder 302 calculates the inverter power source voltage Vo+$\Delta V$=Vn and outputs it to the divider 304. On the other hand, the multiplier 303 calculates an estimated average motor driving voltage Vm that is the product of the previous output average duty cycle Do outputted from the delay unit 306 and the inverter power source voltage Vo, and outputs it to the divider 304.

The divider 304 calculates the target average duty cycle Dnx by Vm/Vn (=Vo*Do/(Vo+$\Delta V$)). The lower limit limiter 305 outputs the lower limit value, if the target average duty cycle Dnx is equal to or less than the lower limit value, and outputs the target average duty cycle Dnx when the target average duty cycle Dnx is not less than the lower limit value. The lower limit value is set as the duty cycle in order to prevent the average duty cycle from becoming too low and the output voltage of the inverter unit 1030 to rise higher than expected. For example, the larger of the following two values is used as the lower limit value.

(1) 75% of the duty cycle equivalent to the electromotive force at the speed before the slew rate limitation (2) fixed duty cycle of 20%

The output Dn of the lower limit limiter 305 is outputted to the delay unit 306, and the delay unit 306 outputs the output Dn as the previous average duty cycle Do after one processing unit time. As an initial value, a predetermined average duty cycle is set to the delay unit 306.

The output Dn of the lower limit limiter 305 is also outputted to the multiplexer 307. When the multiplexer 307 detects the loss braking mode by the braking mode flag, the multiplexer 307 outputs the output Dn from the lower limit limiter 305 as the corrected average duty cycle. On the other hand, when the regeneration mode is detected by the braking mode flag, the multiplexer 307 outputs the predetermined average duty cycle as the corrected average duty cycle.

Instead of such a configuration, a voltage FB controller 2203 that negatively feeds back the difference in the inverter power source voltage from the target voltage may be adopted.

Second Embodiment

Here, a case where the configuration of FIG. 6B is adopted for the separation switch 1040 will be described.

Also in the present embodiment, in the loss braking mode, the MOSFET 1041*a* of the separation switch 1040*a* is turned off to separate the original power source such as the rechargeable battery 101 from the inverter unit 1030.

Then, the same control as in the first embodiment is performed, however, in the present embodiment, the control is intentionally performed with an average duty cycle lower than the average duty cycle in the first embodiment, and the inverter power source voltage is intentionally and constantly set higher than the battery voltage of the rechargeable battery 101.

In this way, due to the potential difference between the battery voltage of the rechargeable battery 101 and the inverter power source voltage, no current flows through the diode 1042*a* of the separation switch 1040*a* during the loss braking mode, and the substantially same function as the separation switch 1040*c* or 1040*d* for blocking bidirectional current, which is depicted in FIG. 6D or 6E, can be made.

Even if the average duty cycle is different, since the current itself is zero, the waveform of the current flowing through the motor 105 does not change and the braking torque is not different from the braking torque in the first embodiment, however, the inverter power supply voltage is only different.

Even when fluctuation of the battery voltage of the rechargeable battery 101 and variations of other various constants are present, it suffices as long as it is guaranteed that the inverter power source voltage is at least higher than the battery voltage and equal to lower than the circuit withstanding voltage. Therefore, the control of the inverter power source voltage may not be performed, or the feedback control may be roughly performed to the target voltage.

However, in the present embodiment, in order to maintain the inverter power source voltage higher than the battery voltage of the rechargeable battery 101 within the range of usable average duty cycle, it is preferable to adopt the intensifying field current method in the vector control method.

In the present embodiment, it is unnecessary to adopt expensive separation switches, and when the same switch is installed at the same position for other purposes, it can be used as it is, so the cost of hardware is cheap.

Further, in the case where the configuration of FIG. 6B is adopted or by turning off only the MOSFET 1041*a* in the configuration of FIG. 6E, the MOSFET 1041*a* is used in substantially the same state as that of FIG. 6B, unexpected regeneration current can be blocked even in the powering state instead of the loss braking mode.

Figure 12:
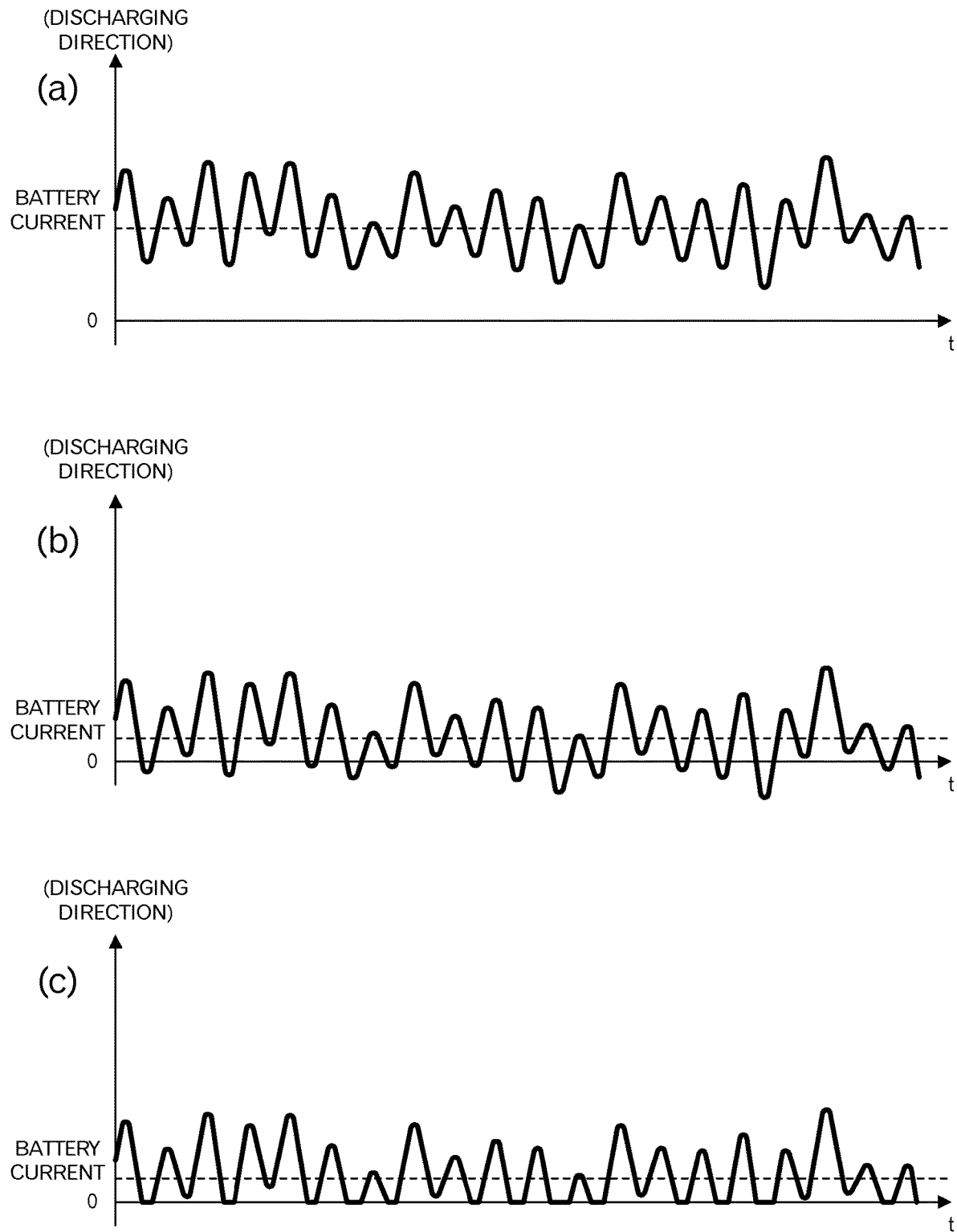
FIG. 12 (a) to (c) are diagrams to explain additional functions in a second embodiment.

Specifically, it will be described with reference to FIG. 12. In FIG. 12 (*a*) to (*c*), the vertical axis represents the battery current and the horizontal axis represents the time.

In the powering state, as depicted by the dotted line in FIG. 12 (*a*), on average, the current flows in the positive direction, that is, the discharging direction. However, the random AC ripple current flows at the same time due to the effect such as, detection errors of the speed, current and the like, detection error of the pedal torque sensor 103 in the motor-assisted bicycle 1, detection error due to vibration and noise caused by the road surface condition, and rounding error at the calculation of driving parameters (lead angle, average duty cycle) using them.

In the case where the powering target torque is large as in accelerating or going up a slope, even if there are AC ripples as depicted in FIG. 12 (*a*), the current is constantly in the discharging direction, so no particular problem occurs.

However, during running with low torque such as during cruising, the current frequently flows instantaneously in the negative direction, that is, charging direction, as depicted in FIG. 12 (*b*). When frequent switching between discharging and charging is repeatedly performed for the chargeable battery 101 in this way, there is an adverse effect on the battery life. Therefore, typically, the lowest assist torque during the low torque powering is limited. That is, by assisting a little more in the case of a powering target torque equal to or greater than a certain value, and by turning off the assist at once if the powering target torque falls below the certain value, no unexpected instantaneous regenerative current flows as much as possible. However, when such countermeasures are taken, the linearity of the assist torque is impaired, a jerky feeling is given to the driver during cruising with the low torque, or the battery power consumption increases due to a little large amount of assistance.

Therefore, in the present embodiment, during cruising with the low torque powering, which is less than a predetermined threshold, the regenerative current is blocked by turning OFF the MOSFET 1041*a* of the separation switch 1040*a* in the same manner as in the loss braking mode. Then, as depicted in FIG. 12 (*c*), the battery current flows only in the discharge direction, certainly.

In this case, it is preferable that an offset is added to the average duty cycle for powering driving so that a higher voltage by the forward drop voltage of the diode 1042*a* of the separation switch 1040*a* is outputted compared to the normal powering. Since the forward drop voltage of the diode 1042*a* is very small during cruising with the low current, compared to the battery voltage, the drop loss hardly causes a problem. Then, since a little large amount of assist as described above becomes unnecessary, the electric power loss is rather decreased, the linearity of the assist torque is secured, and a natural assist feeling can be obtained.

Third Embodiment

In this embodiment, a case where the separation switch 1040*b* depicted in FIG. 6C is employed will be described.

Even in this case, in the loss braking mode, the MOSFET 1041*b* of the separation switch 1040*b* is turned off to separate the original power source such as the rechargeable battery 101 from the inverter unit 1030. Then, the same control as in the first embodiment is performed.

However, by intentionally controlling with the average duty cycle higher than the average duty cycle in the first embodiment, the inverter power source voltage which is lower than the battery voltage of the rechargeable battery 101 is intentionally and constantly kept.

The potential difference between the battery voltage of the rechargeable battery 101 and the inverter power source voltage does not cause a current to flow through the diode 1042*b* of the separation switch 1040*b* during the loss braking mode. Therefore, it is possible to realize substantially the same operation as in the loss braking mode in the first embodiment in which the separation switch 1040 in FIG. 6C or 6D.

Even if the average duty cycle of the inverter unit 1030 is different, since the current itself is zero, the waveform of the current flowing through the motor 105 does not change, the inverter power source voltage is only different, and the braking torque is the same as in the first embodiment.

Even when there are variations in the battery voltage of the rechargeable battery 101 and variations in other various constants, it suffices that the inverter power source voltage is kept at least at a lower voltage than the battery voltage of the rechargeable battery 101. Therefore, similarly to the first embodiment, the inverter power source voltage may not be controlled, or may be roughly perform the feedback control to the target voltage.

However, in the third embodiment, in order to maintain the inverter power source voltage lower than the battery voltage of the rechargeable battery 101 within the range of the usable average duty cycle, it is preferable to use the weakening field current side in the vector control method.

Also in this embodiment, it is unnecessary to employ expensive separation switches, and if the same switch is installed at the same position for other purposes, it can be used as it is, so the cost of hardware is cheap.

Fourth Embodiment

In the loss braking by the vector control, a first current (torque current) for generating the braking torque and recovering the mechanical energy by the braking and a second current (a current (field current) with a phase difference of 90 degrees from the first current and with the same frequency) for consuming the mechanical energy by a resistance component in the motor coil are used.

In contrast to this, as in the first to third embodiments, the separation switch 1040 may be adopted and a current having a frequency different from that of the first current may be employed as the second current.

The torque due to a component having a frequency different from that of the fundamental wave (hereinafter referred to as different frequency component) is the product of the fundamental wave of the counter electromotive force and the different frequency component, therefore, the torque components for the sum frequency and the difference frequency of the fundamental wave and the different frequency component appear. Therefore, as long as a frequency different from the fundamental wave is used, no DC torque component is generated, and only AC ripple torque is generated. Furthermore, when the motor is a three-phase motor and its AC torque components respectively have a phase difference of +/−120 degrees, the total torque of the three phases becomes zero, so that AC vibration torque in a motor does not occur.

Therefore, as a frequency different from the fundamental wave, a frequency higher than the fundamental wave (for example, harmonics) or a frequency lower than the fundamental wave may be employed.

Figure 13:
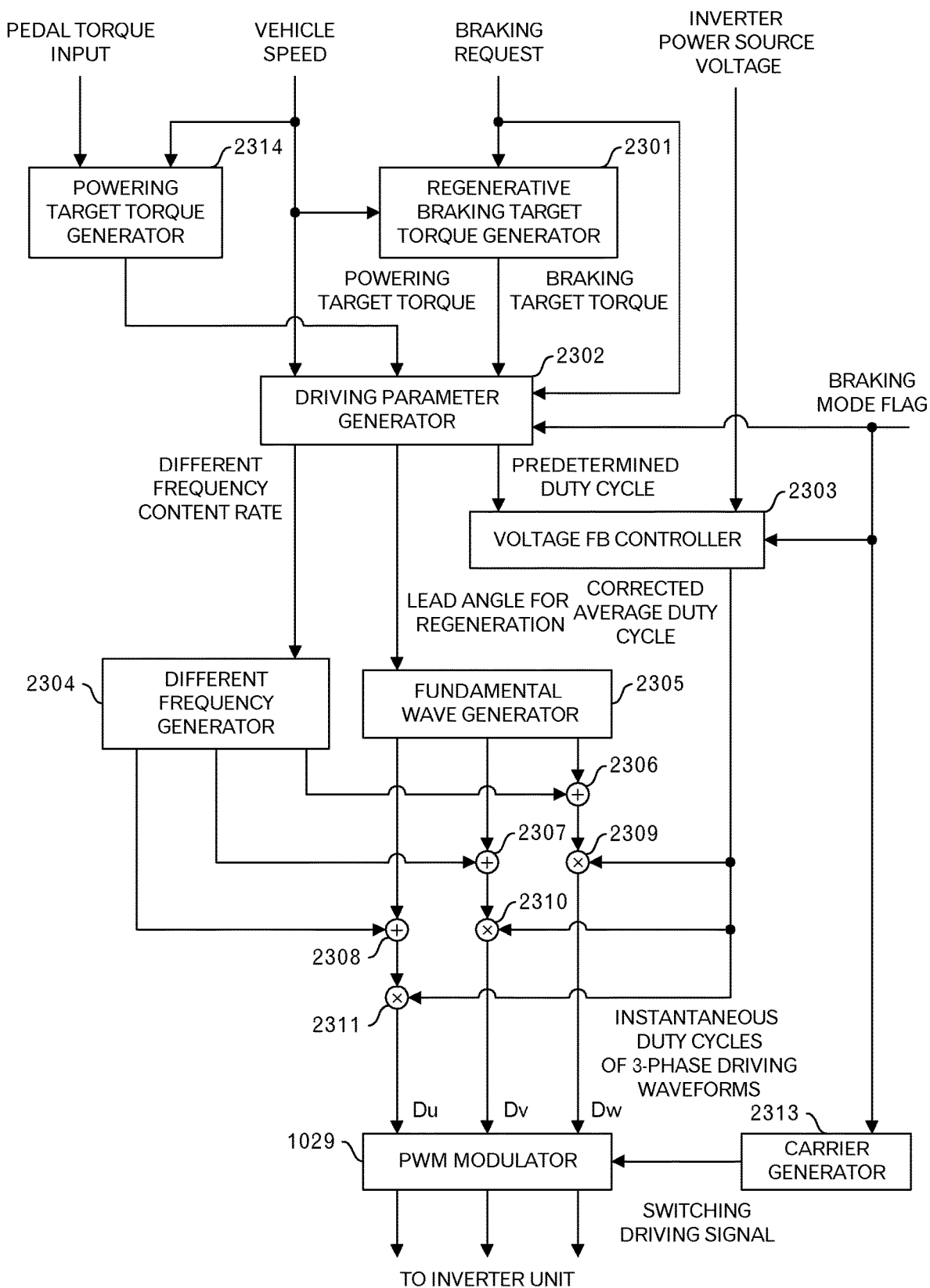
FIG. 13 is a diagram depicting a functional configuration example relating to a fourth embodiment.

FIG. 13 depicts an example of the functional configuration realized by the computing unit 1021 based on this concept.

The loss braking control function realized by the computing unit 1021 includes a regenerative braking target torque generator 2301, a driving parameter generator 2302, a voltage FB controller 2303, a different frequency generator 2304, a fundamental wave generator 2305, adders 2306 to 2308, and multipliers 2309 to 2311, and controls the PWM modulator 1029 and the carrier generator 2313. Note that the computing unit 1021 includes a powering target torque generator 2314 and also performs powering driving in cooperation with the driving parameter generator 2302. The powering target torque generator 2314 is the same as the powering target torque generator 2207 in FIG. 8. In the absence of a braking request, the driving parameter generator 2302 generates and outputs powering parameters using the powering target torque and the vehicle speed. The generation of the powering target torque is the same as the processing by the driving parameter generator 2202. Further, when there is a braking request, the driving parameter generator 2302 performs the processing described below.

When the braking request is inputted, the regenerative braking target torque generator 2301 outputs the braking target torque to the driving parameter generator 2302 according to the vehicle speed from the vehicle speed input unit 1024. The regenerative braking target torque generator 2301 is the same as the regenerative braking target torque generator 2201 in the first embodiment.

The driving parameter generator 2302 specifies a lead angle and a predetermined average duty cycle for the regenerative braking, and a different frequency content rate for generating a different frequency component to consume the same power as the regenerative power, according to the vehicle speed and the braking target torque. In the present embodiment, regardless of the braking mode flag, the lead angle and the predetermined average duty cycle for the regenerative braking are outputted as in the case of the vector control. On the other hand, when the braking mode flag represents the regenerative mode, the different frequency content rate becomes zero.

Here, assuming the coil resistance R, the coil inductance L, the angular frequency $\omega_{rf}$ of the different frequency component, the effective current $I_{rf}$ of the different frequency component, and the effective voltage $E_{rf}$, the power consumption P due to the different frequency component is as follows:

$$P = I_{rf}^2 * R$$
$$= \left[ E_{rf}/\{R^2 + (L\omega_{rf})^2\}^{1/2} \right]^2 * R$$
$$= E_{rf}^2 * R/\{R^2 + (L\omega_{rf})^2\}$$

In this way, since the power consumption P due to the different frequency component increases in proportion to the square of the effective voltage $E_{rf}$, it can also be said that the power consumption increases in proportion to the square of the different frequency content rate which is the ratio of the effective voltage of the different frequency component to the effective voltage of the fundamental wave.

Therefore, the effective voltage $E_{rf}$ and the different frequency content rate are identified and set in advance such that the power consumption P due to the different frequency component coincides with the power obtained by the regenerative braking. A waveform having a frequency different from that of the fundamental wave is arbitrary as long as its frequency does not coincide with the frequency of the fundamental wave.

When the voltage FB controller 2303 detects the loss braking mode by the braking mode flag, the voltage FB controller 2303 performs feedback according to the inverter power source voltage with respect to the predetermined average duty cycle to generate the corrected average duty cycle, and outputs the corrected average duty cycle. The processing by the voltage FB controller 2303 may be the same as the processing by the voltage FB controller 2203.

The fundamental wave generator 2305 generates and outputs a fundamental wave (generally, not limited to a sine wave) having an amplitude "1" and the lead angle for the regeneration, which is outputted by the driving parameter generator 2302, for each of the three phases.

In addition, the different frequency generator 2304 generates and outputs a waveform of a different frequency component having an amplitude according to the different frequency content rate outputted by the driving parameter generator 2302 for each of the three phases.

Then, the adders 2306 to 2308 add the outputs from the fundamental wave generator 2305 and the corresponding outputs from the different frequency generator 2304 and output the results. The multipliers 2309 to 2311 multiply the outputs of the adders 2306 to 2308 by the corrected average duty cycle to generate the instantaneous duty cycles Du, Dv and Dw of the three-phase driving waveform.

The PWM modulator 1029 performs PWM modulation for the outputs of the multipliers 2309 to 2311 based on the signal outputted from the carrier generator 2313 and outputs switching driving signals to the switching elements included in the inverter unit 1030. The PWM modulator 1029 and the carrier generator 2313 are the same as the PWM modulator 1029 and the carrier generator 2206 in the first embodiment.

By performing such processing, the loss braking becomes possible.

It is to be noted that the technical element of consuming the power recovered by the regenerative braking by using different frequency components (including the case of harmonics described below) may be implemented regardless of the introduction of the separation switch. That is, if the regenerative current with respect to the original power source such as the rechargeable battery 101 can be controlled so as to be always zero, the aforementioned technical elements can be implemented without providing the separation switch.

Fifth Embodiment

In the fourth embodiment, the different frequency generator 2304 for generating the waveform of the different frequency component according to the different frequency content rate is introduced, however, instead of this, the fundamental wave generator 2305 may generate a non-sinusoidal wave containing a lot of harmonics.

In this case, since the different frequency content rate is fixed, the control as in the fourth embodiment cannot be performed. Therefore, after adopting a waveform sufficiently including a harmonic component as a driving waveform, the braking torque and the inverter power source voltage control according to the lead angle and the average duty cycle as in the first embodiment are used together.

Specifically, the waveform of the signal generated by the driving waveform generator 2204 in FIG. 8 is changed to a non-sine wave as depicted in FIGS. 14A to 14D. In FIGS. 14A to 14D, the vertical axis represents the voltage and the horizontal axis represents the time.

Figure 14A:
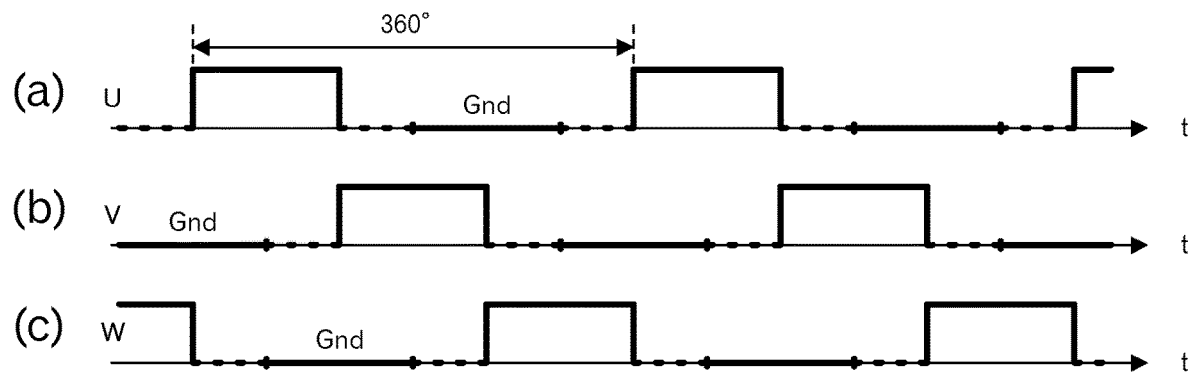
FIG. 14A is a diagram depicting an example of a 120-degree rectangular wave including a 60-degree off period.

(a) to (c) in FIGS. 14A to 14D depicts signal waveform examples of U phase, V phase and W phase. In the example of FIG. 14A, it is basically a 120-degree rectangular wave, however, it is an example of intermittent driving in which a 60-degree off period (high impedance) is provided before rise and after fall. Any motor driving control apparatus that generates such a waveform signal can be easily mounted without any change.

Figure 14B:
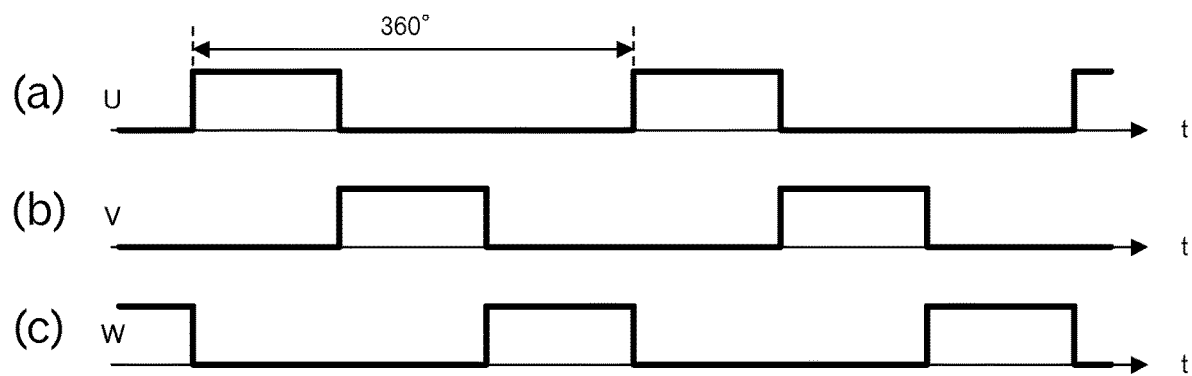
FIG. 14B is a diagram depicting an example of a continuous 120-degree rectangular wave.

Further, in the example of FIG. 14B, the 60-degree off period provided in FIG. 14A is also grounded so that the energization driving is continuously performed. When it is possible to generate a waveform as depicted in FIG. 14A, it is not difficult to generate a signal having a waveform as depicted in FIG. 14B.

Figure 14C:
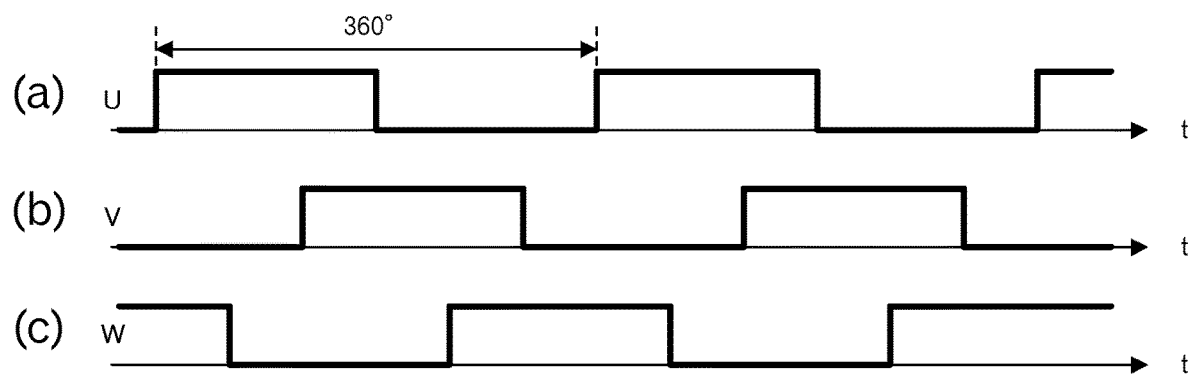
FIG. 14C is a diagram depicting an example of a continuous 180-degree rectangular wave.
Figure 14D:
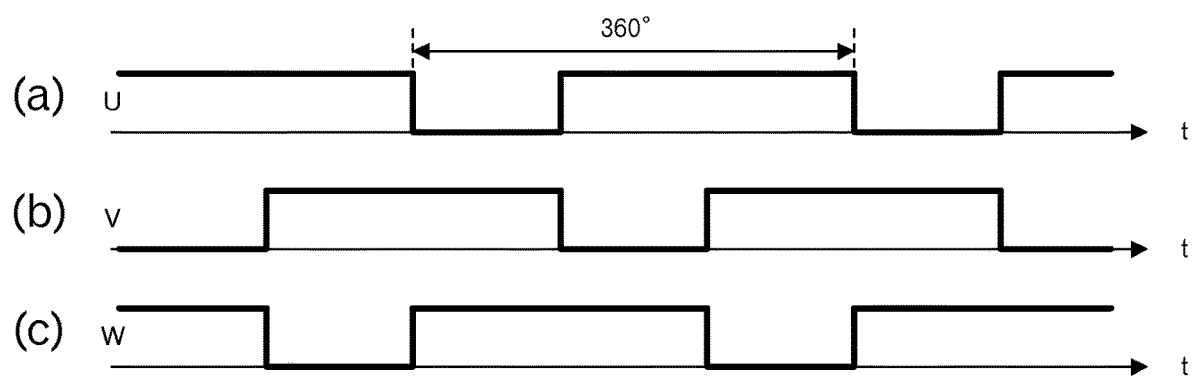
FIG. 14D is a diagram depicting an example of a continuous 240-degree rectangular wave.

In addition, FIG. 14C depicts an example of a 180-degree rectangular wave, which is grounded during 180 degrees, and FIG. 14D depicts an example of a 240-degree rectangular wave, which is grounded during 120 degrees to perform the energization driving, continuously.

By adopting such a waveform, since a current for consuming the power, which has the phase difference of 90 degrees and has the same frequency as that of the fundamental wave, is decreased by the harmonic current flowing according to the harmonic wave component, as compared with the first to third embodiment, it is possible to reduce fluctuation of the torque due to the lead angle error. That is, the stable control becomes easy. However, although it is easy to hear coil squeal due to the harmonic current components, that is, noise, it can be relaxed by means of soundproof measures.

If a distorted waveform including harmonics is adopted as in the present embodiment, further power consumption can be made.

[About Other Technical Element A]

Figure 15:
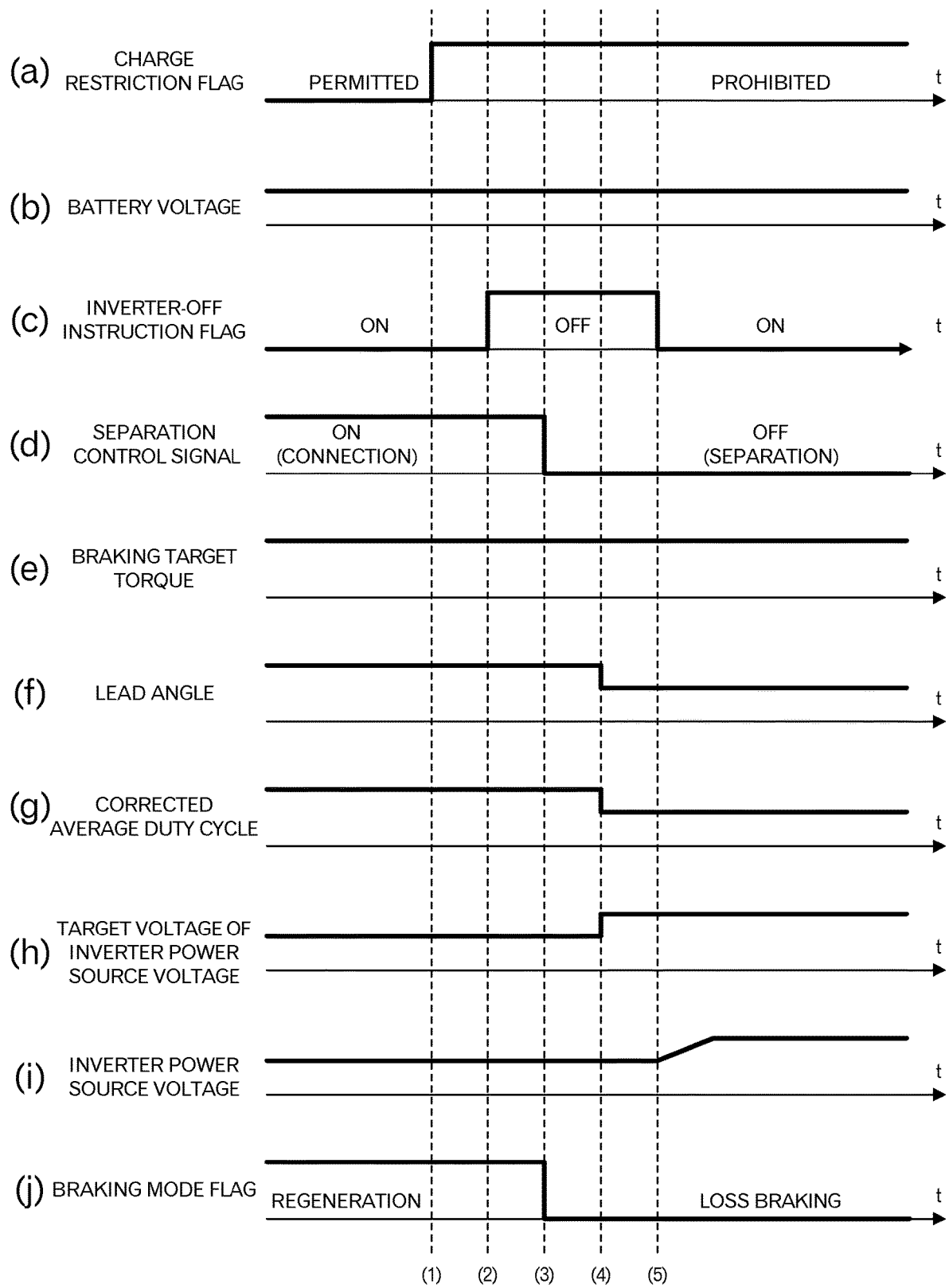
FIG. 15 (a) to (j) are diagrams depicting signal changes in case of transition to the loss braking mode during the regenerative braking.
Figure 16:
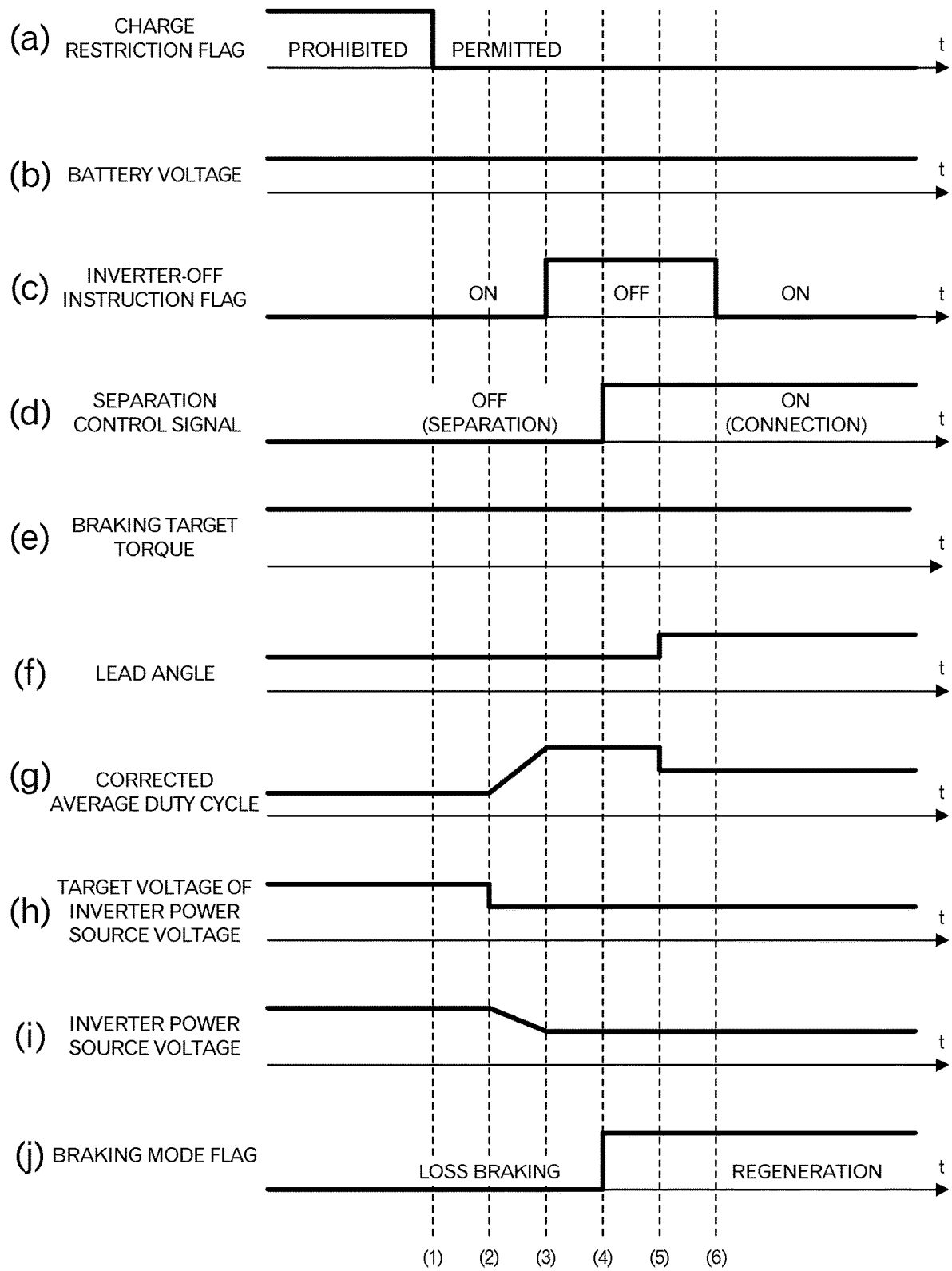
FIG. 16 (a) to (j) are diagrams depicting signal changes in case of transition from the loss braking mode to the regenerative braking.

Detailed control timing and signal changes of the separation controller 2100 and the like in the loss braking mode will be described with reference to FIGS. 15 and 16. In FIGS. 15 and 16, the vertical axis represents the voltage and the horizontal axis represents the time.

First, the operation at shifting to the loss braking mode will be described with reference to FIG. 15.

When detecting the event that the regenerative current cannot flow into the rechargeable battery 101 due to the reason such as the fully charged state of the rechargeable battery 101 or the like, the separation controller 2100 changes the internal charge restriction flag from OFF (permitted) to ON (prohibited) (at timing (1)).

Thereafter, when the charge restriction flag is turned ON during the regenerative braking, the separation controller 2100 sets high (OFF) for the internal inverter-off instruction flag as depicted in FIG. 15 (c) and makes the inverter unit 1030 the high impedance state (at timing (2)). This is because the driving parameters in the regenerative braking and the driving parameters in the loss braking mode are different each other, so that the transient state is not outputted to the motor 105.

Thereafter, as depicted in FIG. 15 (d), the separation controller 2100 turns off (makes separation) the separation control signal and instructs the separation switch 1040 to separate the original power source such as the rechargeable battery 101 (at timing (3)). For example, in the case of FIG. 6D, the MOSFET 1041c is turned off. The reason why the original power source such as the rechargeable battery 101 is separated after the timing (2) is because there is a possibility that the hardware may be damaged unless the inverter unit 1030 was turned off. In the present embodiment, at timing (3), the separation controller 2100 changes the braking mode flag to represent the loss braking mode from the regenerative mode, as depicted in FIG. 15 (j).

Then, as depicted in FIG. 15 (h), the target voltage of the inverter power source voltage in the loss braking mode is set, and as depicted in FIG. 15 (f), the lead angle for the loss braking according to the vehicle speed and the braking target torque is set, and the corrected average duty cycle changes as depicted in FIG. 15 (g) (at timing (4)). As depicted in FIG. 15 (b), the battery voltage of the rechargeable battery 101 is unchanged, and in the present embodiment, as depicted in FIG. 15 (e), in the regenerative braking and the loss braking mode, the braking target torque is unchanged.

Thereafter, as depicted in FIG. 15 (c), the separation controller 2100 sets low (ON) for the inverter-off instruction flag to control the inverter unit 1030 in the loss braking mode (at timing (5)). Then, as depicted in FIG. 15 (i), the inverter power source voltage changes so as to approach the target voltage.

In this way, the mode transition is safely performed from the regenerative braking to the loss braking.

Next, the operation at shifting to the regenerative braking will be described with reference to FIG. 16.

When detecting the event that the regenerative current can flow into the rechargeable battery 101 due to the charging state of the rechargeable battery 101 or the like, the separation controller 2100 sets OFF (permitted) for the internal charge restriction flag from ON (prohibited) (at timing (1)).

Thereafter, when the charge restriction flag is turned off, the separation controller 2100 sets, as the target voltage of the inverter power source voltage, the battery voltage (FIG. 16 (b)) of the rechargeable battery 101 as depicted in FIG. 16 (h) (at timing (2)). This is to prevent the rush current from flowing, when, for example, the MOSFET 1041c of the separation switch 1040 is turned on.

In this way, as depicted in FIG. 16 (g), the corrected average duty cycle increases, for example, and as depicted in FIG. 16 (i), the inverter power source voltage gradually becomes equal to the same potential as the battery voltage of the rechargeable battery 101.

Thereafter, when detecting that the inverter power source voltage and the battery voltage of the rechargeable battery 101 have become equal to each other, the separation controller 2100 sets high (OFF) for the inverter-off instruction flag from low (ON) as depicted in FIG. 16 (c) and makes the inverter unit 1030 a high impedance state (at timing (3)). This is because the transient state at the time of mode transition is not outputted to the motor 105.

Thereafter, the separation controller 2100 turns ON (connection) the separation control signal and instructs the separation switch 1040 to connect the original power source such as the rechargeable battery 101 (at timing (4)). For example, in the case of FIG. 6D, the MOSFET 1041c is turned on. The reason why the rechargeable battery 101 is connected after the timing (3) as described above is because the hardware may be damaged unless the inverter unit 1030 was turned off. In the present embodiment, at timing (4), the separation controller 2100 changes the braking mode flag from the loss braking mode to the regenerative mode as depicted in FIG. 16 (j).

Thereafter, the lead angle and the average duty cycle for the regenerative braking are set, and the lead angle and the corrected duty cycle change (at timing (5)) as depicted in FIGS. 16 (g) and (f).

Because the preparation is complete as a result, the separation controller 2100 sets low (ON) for the inverter-off instruction flag from high (OFF), as depicted in FIG. 16 (c), so that the control of the inverter unit 1030 in the regenerative braking is performed (at timing (6)).

By performing such an operation, the mode transition is safely performed from the loss braking to the regenerative braking.

The powering and the regeneration are equally treated as the control mode, although the lead angle and the average duty cycle are only different in them due to the different target torque.

Although the separation control signal and the braking mode flag have the same shape in FIGS. 15 and 16, they are not actually the same, in other words, the braking mode flag represents the logical signal level and as for the separation control signal, the polarity, output potential and amplitude are different according to the type of the separation switch. In this example, the representation is unified for the N-channel MOSFET.

In FIG. 15 and FIG. 16, the target voltage of the inverter power source voltage and the inverter power source voltage varying according to the target voltage of the inverter power source voltage are represented for the case of FIG. 6B or 6D or for the case where FIG. 6E is used to be equivalent to FIG. 6B or 6D. Therefore, when the separation switch is in the OFF (separation) state, the inverter power source voltage is made higher than the battery voltage.

On the other hand, in the case of the connection in FIG. 6C or in case where FIG. 6E is used to be equivalent to FIG. 6C, if operating in the same way as in FIGS. 15 and 16, when the separation switch is in the OFF (separation) state, the inverter power source voltage is made lower than the battery voltage, on the contrary.

As a result, the diodes in parallel with the separation switch are also in the separated state, and the operation substantially equivalent to the switch that is bidirectionally turned OFF can be achieved.

[About Other Technical Element B]

In the loss braking mode, the second current (field current) for consuming the electric power in the motor coil, the current including the different frequency components and the like become very larger than those during the normal powering and regenerative braking, and the very large current flows through plural switching elements in the inverter unit 1030. Therefore, the amount of heat generation thereof dramatically increases in proportion to the square of the current.

Therefore, since the switching frequency in the inverter unit 1030 is set by the carrier generator 2206 or 2313, this frequency is changed according to the mode. Specifically, when shifting to the loss braking mode, for example, the separation controller 2100 instructs the carrier generator 2206 or 2313 to use a frequency lower than the switching frequency during the normal powering or regenerative braking. In this way, it is possible to reduce the heat generation due to switching loss caused by the switching elements.

When the low switching frequency is adopted, the current attenuation decreases due to an increase in the inductive reactance component of the motor coil, and the ripple current component of the switching frequency increases. This is not preferable because the driving efficiency decreases during the normal powering or regenerative braking. However, in the loss braking mode, there is no problem because the power consumption by the motor coil or the like is the purpose of origin.

[About Other Technical Element C]

Figure 17:
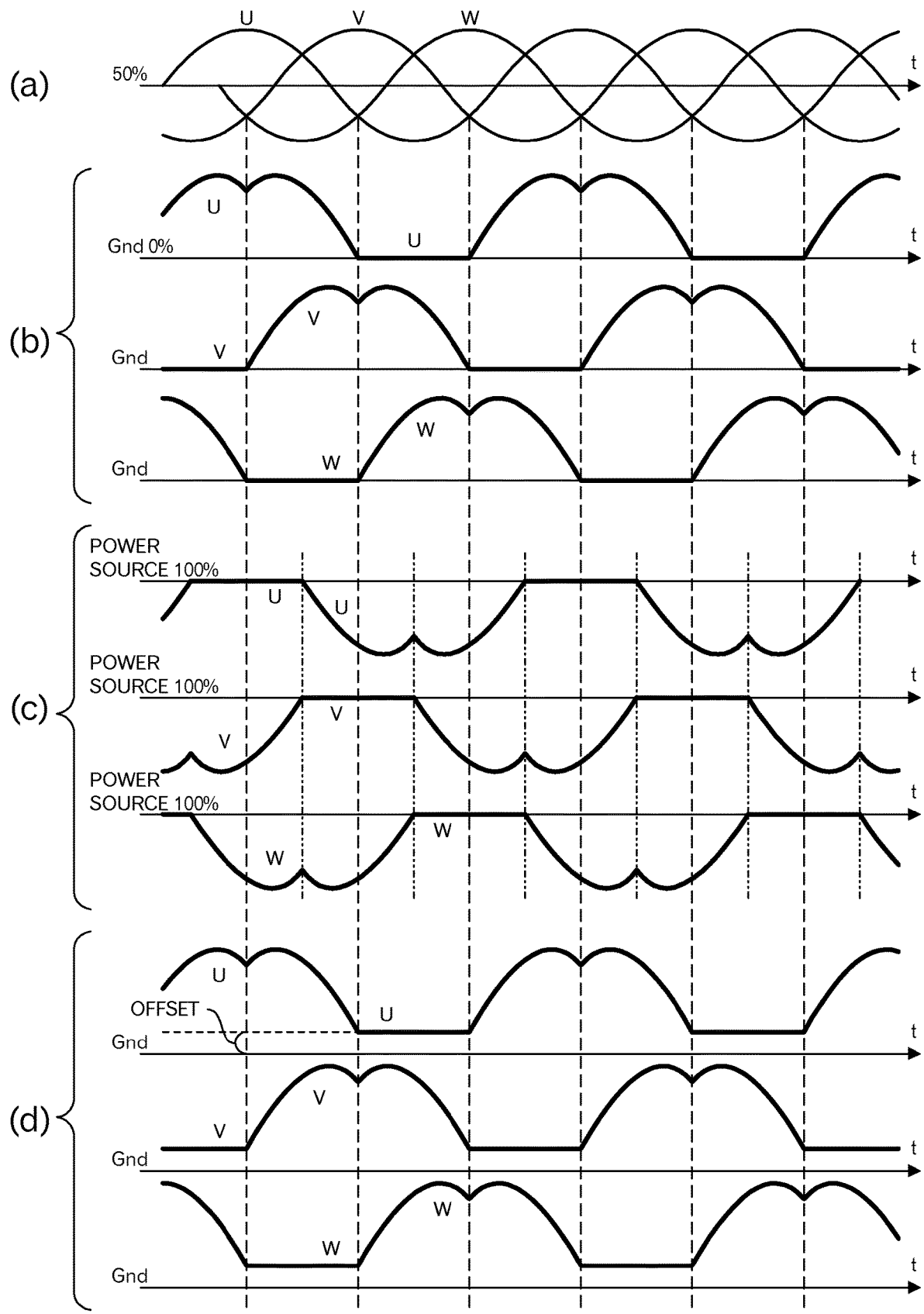
FIG. 17 (a) to (d) are diagrams depicting variations of driving waveforms.

When a three-phase motor is used, the waveform generation method by the driving waveform generator 2204 generally includes a three-phase driving method of three-line modulation which generates a three-phase AC voltage in which, as the center point (50%), a middle point between a ground potential (Gnd 0%) and a power source voltage (power source 100%) is used as depicted in FIG. 17 (a) and a three-phase driving method of two-line modulation in which, at all times, the potential of a line whose voltage is the lowest among the three-line in each moment is shifted and fixed to the ground potential and the voltages for the other two lines is shifted by the same shifted voltage as depicted in FIG. 17 (b). In FIG. 17, an example of sinusoidal wave driving is depicted, however, an approach is the same even in case of non-sinusoidal wave driving. In FIG. 17, the vertical axis represents the voltage and the horizontal axis represents the time.

Originally, there is only 2 degrees of freedom in the relative potential difference among the three lines, and the relative potential difference waveforms are the same in any driving, so any method of driving can be employed. Typically, since the number of modulation switching times is as small as ⅔, which is advantageous in that unnecessary radiation and switching loss are reduced and the maximum potential difference among the three lines is the same as the power source voltage, the three-phase driving method of the two-line modulation are often used.

However, in the loss braking mode, the current flowing through the switching elements included in the inverter unit 1030 is very large, and the heat generation due to the ON resistance loss increases in proportion to the square of the current, so it becomes very large.

At this time, in the three-phase driving method of the two-line modulation, instead of using, as the center, the midpoint between the ground potential and the power source voltage, the ground potential is used as the reference to drive. Therefore, the average of the instantaneous duty cycles of the three-phase driving waveform becomes extremely low in many cases. Therefore, the time ratio during which the current flows through the lower switching elements (Sul, Svl and Swl in FIG. 5) of the inverter unit 1030 is very large, and the balance of the heat generations of the lower switching elements and the upper switching elements (Suh, Svh and Swh in FIG. 5) is largely destroyed, and the heat generation of the lower switching elements becomes a problem.

Therefore, as a first method, a following method is considered. Namely, the efficiency is maximized by using the three-phase driving method (FIG. 17 (b)) of the two-line modulation during the regenerative braking and powering, and only in the loss braking mode, the three-phase driving method (FIG. 17 (a)) of the three-line modulation, in which the midpoint is used as the center, is used. Accordingly, it is possible to balance the heat generations of the upper and lower switching elements and to minimize the heat generation of the lower switching elements.

As a second method, if it is possible to generate a waveform like the three-phase driving method (FIG. 17 (c)) of the two-line modulation, in which the power source voltage is used as the reference on the contrary to FIG. 17 (b), a method may be employed in which switching between the three-phase driving method of the two-line modulation, in which the ground is used as the reference, and the three-phase driving method of the two-line modulation, in which the power source voltage is used as the reference, is performed at a period sufficiently longer than the switching cycle in the inverter unit 1030 and sufficiently shorter than the thermal time constant (for example, about 1 to about 10 seconds). Accordingly, it is also possible to balance the heat generations of the upper and lower switching elements while taking advantages of the three-phase driving method of the two-line modulation. It should be noted that the performance period of the three-phase driving method of the two-line modulation, in which the ground is used as the reference, and the performance period of the three-phase driving method of the two-line modulation, in which the power source voltage is used as the reference, need not be the same and may be changed dynamically.

Furthermore, as a third method, by offsetting the instantaneous duty cycle of the three-phase driving waveform according to the input of the average duty cycle, as depicted in FIG. 17 (d), the average of the instantaneous duty cycle of the three-phase driving waveform may be always kept at about 50%. In this case, because the driving waveform is the same as the waveform of the three-phase driving of the two-line modulation, however, there is no time to hold the potential at the ground potential, it is substantially the same as the three-phase driving method of the three-line modulation.

Figure 18:
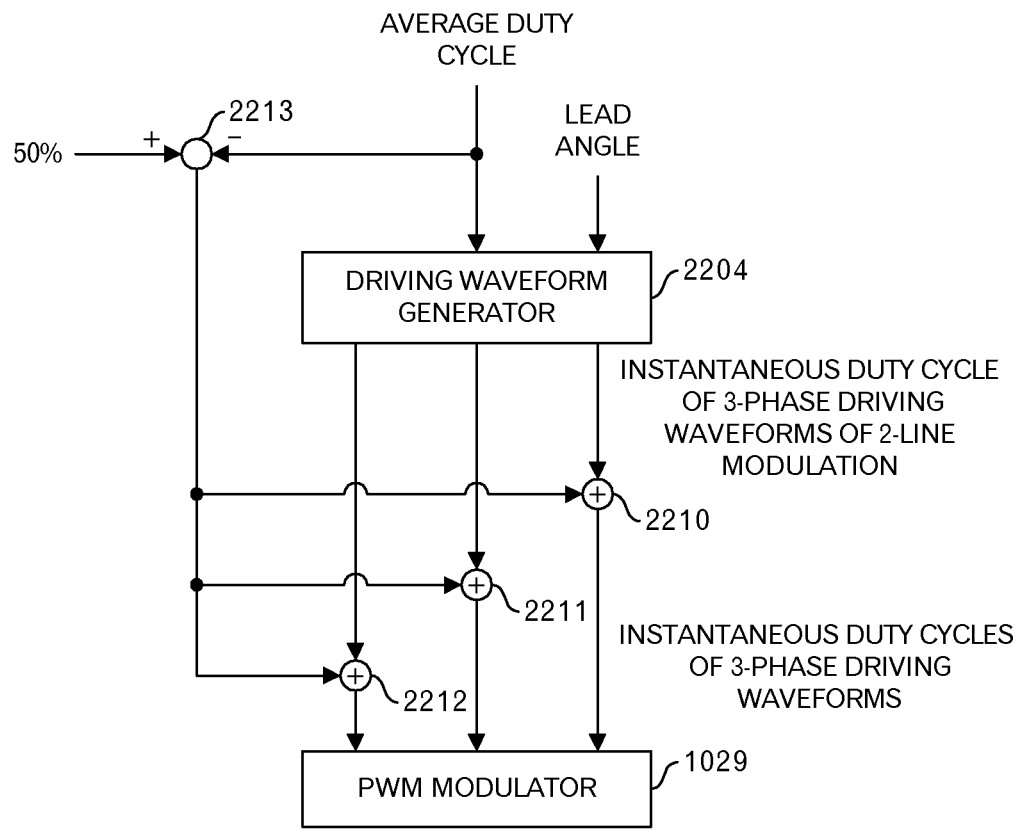
FIG. 18 is a diagram depicting a configuration example to generate the driving waveform depicted in FIG. 17 (db).

In the case of adopting the third method, for example, it may be changed to a configuration as depicted in FIG. 18. More specifically, adders 2210 to 2213 are added.

Then, the adder 2213 calculates (the 50%—the average duty cycle) to generate an offset, and when the adder 2210 to 2212 adds the offset to the instantaneous duty cycle of the three-phase driving waveform of the two-line modulation, which is generated by the driving waveform generator 2204, waveforms as depicted in FIG. 17 (d) are generated.

By balancing and minimizing the heat generations of the upper and lower switching elements by these methods, it is possible to suppress the rise in temperature of a specific switching element and ensure the time during which the loss braking can be continued as long as possible.

Although the embodiments of the present invention have been described above, the present invention is not limited thereto. For example, the technical elements described in each embodiment may be partially excluded, arbitrary technical elements may be selectively used, or plural embodiments may be combined. Furthermore, there are cases where other technical elements are added in addition to the above-described embodiments.

The specific configuration of the controller 1020 is merely an example, and various configurations capable of realizing similar functions may be adopted according to the computing unit 1021 and other configurations. With respect to the computing unit 1021, the aforementioned functions may be realized by a dedicated circuit, a combination of a microprocessor that executes a specific program and a dedicated circuit, or the like. In FIGS. 8 and 13, as an example of adaptation to a motor-assisted bicycle, an explanation was given of generating an assist target torque according to human power pedal torque input, vehicle speed and the like as the powering target torque by the powering target torque generator 2207 and 2314. However, the target to which the present embodiments are applied is not limited to such a motor-assisted vehicle. That is, the present invention can also be applied to general electric-powered vehicles or other electric apparatus having a powering target torque generator, which is configured to generate a powering target torque corresponding to the operation amount of the accelerator pedal, the accelerator grip, the accelerator lever or the like in place of the pedal torque input, or generate the powering target torque so as to automatically control the speed and/or acceleration.

In the aforementioned embodiments, an example in which the present invention is applied to a motor-assisted bicycle has been described. However, a target of the present invention is not limited to the motor-assisted bicycle or the like (a mobile object (e.g., a dolly, a wheelchair, an elevator, etc. Also referred to as a motor-assisted apparatus), which moves using the assist according to the human power by a motor (also called a power plant), and the present invention can be applied to a case where the motor braking is freely performed in all apparatuses using motors such as electric motorcycles, electric wheelchairs, electric vehicles, hybrid vehicles, trains, cable cars, elevators, other machinery.

In the above-described embodiment, a battery is used as an original power source. However, as the original power source, the present invention can be applied to not only a battery but also a primary battery, any device connected by an electric wire, and an external DC power supply device, which supplies the power through the wire to the mobile object, a DC power supply line, or the like.

Furthermore, the present invention can be applied to not only a case where the regeneration is temporarily impossible although the regeneration is normally possible, such as a rechargeable battery and a DC power source that can also regenerate to the line, but also a case where the regeneration is always impossible such as a case where the primary battery that cannot be charged at first is used, a case where it is provided as a DC line that cannot be regenerated to a power supply wire in a train, a trolley bus, etc. due to a transformer substation using diode rectification or the like.

Even when the present invention is applied to these cases, without destroying or adversely affecting the primary battery or the power supply device and without using other power consuming devices, further without adversely affecting other devices connected to the same power source, the motor braking can be made by freely controlling the torque.

The aforementioned embodiments can be summarized as follows:

The motor driving control apparatus relating to the present embodiments includes: (A) an inverter unit configured to drive a motor; (B) a separation switch configured to electrically separate the power source from the inverter unit; and (C) a controller configured to instruct the separation switch to separate the power source from the inverter unit and control the inverter unit to perform switching according to a speed and a braking target torque, upon detecting an event that braking should be performed without passing a regenerative current to the power source from the inverter unit.

By introducing the separation switch that operates as described above, it is possible to perform control such that the motor itself consumes electric power without passing a regenerative current to a power source such as a battery.

The aforementioned separation switch may be (b1) a switch to block a current from the power source to the inverter unit and a current from the inverter unit to the power source, (b2) a switch to selectively or simultaneously block a current from the power source to the inverter and a current from the inverter unit to the power source, (b3) a switch to block a current from the inverter unit to the power source, or (b4) a switch to block a current from the power source to the inverter unit.

In case of (b1), the regenerative current and discharging current can be reduced to zero and the primary battery can also be safely used. Furthermore, even if the voltage on the inverter unit side is high voltage or low voltage, it can deal with it. When it is possible to selectively cut off any one of the currents in case of (b2), it can be utilized for other purposes (For example, during powering or during the regenerative braking). As for (b3) and (b4), they can be used under the respective constraint conditions.

Furthermore, when the current in the charging direction can be blocked, the controller may be configured to instruct the separation switch to block the current from the inverter unit to the power source at powering by a powering target torque that is less than a predetermined threshold. In this way, it is possible to prevent deterioration of the battery due to instantaneous regenerative current that may occur even during the powering.

The present motor driving control apparatus may further include a smoothing capacitor provided on an inverter unit side of the separation switch. The capacity of such a smoothing capacitor is larger than the capacity of other capacitors provided on the power source side.

In addition, in the present motor driving control apparatus, a connection to the controller or an element that is connected to an apparatus on which the motor is mounted and consumes electric power may be made so as to supply electric power from an inverter side of the separation switch. Furthermore, a connection to the controller or an element that is connected to an apparatus on which the motor is mounted and consumes electric power may be made so as to supply electric power from a power source side of the separation switch. Further, a connection to the controller or an element that is connected to an apparatus on which the motor is mounted and consumes electric power may be made so as to supply electric power from a higher voltage side of an inverter side of the separation switch and a power source side of the separation switch.

Furthermore, the aforementioned controller may include (d1) a first generator configured to generate a first signal according to the speed and the braking target torque; and (d2) a second generator configured to generate a second signal to cause the inverter to perform switching, based on the first signal generated by the first generator. In this case, the first generator may be configured to set, according to the speed and the braking target torque, a lead angle and/or an amplitude corresponding to an average duty cycle with respect to a waveform of the first signal. According to the present embodiments, by adopting the separation switch, the degree of freedom in controlling the lead angle and the average duty cycle is increased.

In addition, the first generator may be configured to set only the lead angle of the waveform of the first signal according to the speed and the braking target torque. This is because it is sometimes unnecessary to control the voltage on the inverter unit side of the separation switch.

Further, the aforementioned first generator may be configured to set the average duty cycle based on a target voltage on an inverter side of the separation switch. Furthermore, the aforementioned first generator may be configured to adjust or control the average duty cycle based on a present voltage or a target voltage on an inverter unit side of the separation switch. In this way, the inverter power source voltage can be appropriately controlled.

Furthermore, the aforementioned controller may include: (d3) a first generator configured to generate a first signal according to the speed and the braking target torque; and (d4) a second generator configured to generate a second signal to cause the inverter to perform switching, based on the first signal generated by the first generator. In this case, the first signal may include a different frequency component from a predetermined fundamental wave for regenerative braking. In this way, it is possible to consume the recovered mechanical energy with a motor coil or the like with a frequency component different from that of the fundamental wave.

In addition, the aforementioned first generator may be configured to set the different frequency component based on a different frequency content rate according to the speed and the braking target torque. Thus, the consumed power can be adjusted.

Furthermore, the aforementioned first generator in (d3) may be configured to set the average duty cycle of the first signal based on the target voltage on the inverter unit side of the separation switch or adjust the average duty cycle of the first signal based on the current voltage and the target voltage on the inverter unit side of the separation switch. In this way, the inverter power source voltage can be appropriately controlled.

Furthermore, the aforementioned first signal may include a harmonic component of a predetermined fundamental wave for the regenerative braking. Harmonics are sometimes preferred for control. In addition, the aforementioned first signal may be a signal of a non-sinusoidal waveform (for example, a rectangular wave). This is preferable because loss is increased, and electric power can be consumed.

In a case where the first signal includes a component having a different frequency from that of the fundamental wave or the like, the aforementioned first generator may be is configured to set, according to the speed and the braking target torque, a lead angle and/or an amplitude corresponding to an average duty cycle with respect to a waveform of the first signal. As a result, it becomes possible to appropriately control the braking torque or the consumed power.

The aforementioned motor may be a three-phase motor (for example, a three-phase coil driving motor). In this case, the aforementioned controller may include: (d1) a first generator configured to generate a first signal according to the speed and the braking target torque; and (d2) second generator configured to generate a second signal to cause the inverter to perform switching, based on the first signal generated by the first generator. Then, the aforementioned first signal may be a signal obtained by adding a predetermined offset value to a signal based on the three-phase driving of two-line modulation. This makes it easy to balance the heat generation of the switching elements in the inverter unit.

In addition, while the aforementioned first generator may be configured to generate a signal that is based on three-phase driving of three-line modulation as the first signal during detecting the event. Even with such a method, the heat generation of the switching elements in the inverter unit can be easily balanced.

Furthermore, the aforementioned first generator may be configured to generate the first signal by switching a signal that is based on three-phase driving of two-line modulation, in which a ground is used as reference, and a signal that is based on three-phase driving of two-line modulation, in which a power source voltage is used as reference. Even with such a method, the heat generation of the switching elements in the inverter unit can be easily balanced.

In addition, the aforementioned controller may be configured to lower a switching frequency by the inverter compared with a switching frequency before the detecting the event. As a result, the amount of heat generated by the inverter unit can be reduced.

Furthermore, the aforementioned braking target torque may be the same as the braking target torque in the case of performing the regenerative braking. In this way, the driver does not feel uncomfortable. The same as in this case shall include a range that the driver feels substantially the same.

Furthermore, when detecting the event during regenerative braking, a braking target torque during the regenerative braking may be used as a braking target torque immediately after detecting the event, and a later braking target torque may be smoothly changed. After smooth transition to the loss braking mode, the braking target torque may be gradually decreased in order to reduce the heating value, or in the case of transition to the loss braking mode with a small braking torque, the braking target torque may be gradually increased.

Such a configuration is not limited to the matters described in the embodiments and may be implemented in another configuration that substantially exerts the same effect.

In addition, some or all of the motor driving control apparatus may be realized by a dedicated circuit, or by the microprocessor executing the program to realize the aforementioned functions.

What is claimed is:

1. A motor driving control apparatus, comprising:
an inverter configured to drive a motor;
a separation switch configured to block a current from the inverter to a power source; and
a controller configured to instruct the separation switch to separate the power source from the inverter and control the inverter to perform switching according to a speed and a braking target torque, upon detecting an event that braking should be performed without passing a regenerative current to the power source from the inverter,
wherein the controller comprises:
a first generator configured to generate a first signal according to the speed and the braking target torque; and
a second generator configured to generate a second signal to cause the inverter to perform switching, based on the first signal generated by the first generator, and the first generator is configured to set, according to the speed and the braking target torque, a lead angle and/or an amplitude corresponding to an average duty cycle with respect to a waveform of the first signal.

2. The motor driving control apparatus as set forth in claim 1, wherein the power source is a battery.

3. The motor driving control apparatus as set forth in claim 1, wherein the controller is configured to instruct the separation switch to block the current from the inverter to the power source at powering by a powering target torque that is less than a predetermined threshold.

4. The motor driving control apparatus as set forth in claim 1, further comprising a smoothing capacity provided on an inverter side of the separation switch.

5. The motor driving control apparatus as set forth in claim 1, wherein a connection to the controller or an element that is connected to an apparatus on which the motor is mounted and consumes electric power is made so as to supply electric power from an inverter side of the separation switch.

6. The motor driving control apparatus as set forth in claim 1, wherein a connection to the controller or an element that is connected to an apparatus on which the motor is mounted and consumes electric power is made so as to supply electric power from a power source side of the separation switch.

7. The motor driving control apparatus as set forth in claim 1, wherein a connection to the controller or an element that is connected to an apparatus on which the motor is mounted and consumes electric power is made so as to supply electric power from a higher voltage side of an inverter side of the separation switch and a power source side of the separation switch.

8. The motor driving control apparatus as set forth in claim 1, wherein the first generator is configured to set only the lead angle of the waveform of the first signal according to the speed and the braking target torque.

9. The motor driving control apparatus as set forth in claim 1, wherein the first generator is configured to set the average duty cycle based on a target voltage on an inverter side of the separation switch.

10. The motor driving control apparatus as set forth in claim 1, wherein the first generator is configured to adjust the average duty cycle based on a present voltage or a target voltage on an inverter side of the separation switch.

11. The motor driving control apparatus as set forth in claim 1, wherein
the first signal includes a different frequency component from a predetermined fundamental wave for regenerative braking.

12. The motor driving control apparatus as set forth in claim 11, wherein the first generator is configured to set the different frequency component based on a different frequency content rate according to the speed and the braking target torque.

13. The motor driving control apparatus as set forth in claim 11, wherein the first signal includes a harmonic component of the predetermined fundamental wave for the regenerative braking.

14. The motor driving control apparatus as set forth in claim 13, wherein the first signal is a signal of a non-sinusoidal wave.

15. The motor driving control apparatus as set forth in claim 11, wherein the first generator is configured to set an average duty cycle of the first signal based on a target voltage on an inverter side of the separation switch.

16. The motor driving control apparatus as set forth in claim 11, wherein the first generator is configured to adjust an average duty cycle of the first signal based on a present voltage and a target voltage on an inverter side of the separation switch.

17. The motor driving control apparatus as set forth in claim 1, wherein the motor is a three-phase motor, and the first signal is a signal obtained by adding a predetermined offset value to a signal based on three-phase driving of two-line modulation.

18. The motor driving control apparatus as set forth in claim 1, wherein the motor is a three-phase motor, and the first generator is configured to generate a signal that is based on three-phase driving of three-line modulation as the first signal during detecting the event.

19. The motor driving control apparatus as set forth in claim 1, wherein the motor is a three-phase motor, and the first generator is configured to generate the first signal by switching a signal that is based on three-phase driving of two-line modulation, in which a ground is used as reference, and a signal that is based on three-phase driving of two-line modulation, in which a power source voltage is used as reference.

20. The motor driving control apparatus as set forth in claim 1, wherein the controller is configured to lower a switching frequency by the inverter compared with a switching frequency before the detecting the event.

21. The motor driving control apparatus as set forth in claim 1, wherein the braking target torque is the same as a braking target torque in case of regenerative braking.

22. The motor driving control apparatus as set forth in claim 1, wherein, when detecting the event during regenerative braking, a braking target torque during the regenerative braking is used as a braking target torque immediately after detecting the event, and a later braking target torque is smoothly changed.

23. The motor driving control apparatus as set forth in claim 22, wherein the later braking target torque is gradually decreased.

24. An electric apparatus, comprising:

a motor driving control apparatus, comprising:

an inverter configured to drive a motor;

a separation switch configured to block a current from the inverter to a power source; and a controller configured to instruct the separation switch to separate the power source from the inverter and control the inverter to perform switching according to a speed and a braking target torque, upon detecting an event that braking should be performed without passing a regenerative current to the power source from the inverter, wherein the controller comprises:

a first generator configured to generate a first signal according to the speed and the braking target torque; and a second generator configured to generate a second signal to cause the inverter to perform switching, based on the first signal generated by the first generator, and the first generator is configured to set, according to the speed and the braking target torque, a lead angle and/or an amplitude corresponding to an average duty cycle with respect to a waveform of the first signal.

* * * * *